(12) United States Patent
Sugahara et al.

(10) Patent No.: US 7,650,062 B2
(45) Date of Patent: Jan. 19, 2010

(54) INFORMATION RECORDING APPARATUS, INFORMATION REPRODUCING APPARATUS, AND RELATED COMPUTER PROGRAMS

(75) Inventors: Takayuki Sugahara, Yokosuka (JP); Seiji Higurashi, Fuchu (JP); Takashi Kuriyama, Yokohama (JP); Terumi Ohara, Yokohama (JP); Namio Yamaguchi, Hirakata (JP)

(73) Assignee: Victor Company of Japan, Ltd., Yokohama (JP)

( * ) Notice: Subject to any disclaimer, the term of this patent is extended or adjusted under 35 U.S.C. 154(b) by 815 days.

(21) Appl. No.: 11/324,539

(22) Filed: Jan. 4, 2006

(65) Prior Publication Data

US 2006/0159430 A1    Jul. 20, 2006

(30) Foreign Application Priority Data

Jan. 14, 2005 (JP) ............... 2005-007644
Jan. 14, 2005 (JP) ............... 2005-007647
Nov. 17, 2005 (JP) ............... 2005-332539

(51) Int. Cl.
*H04N 7/00* (2006.01)
*H04N 5/00* (2006.01)

(52) U.S. Cl. .................. 386/107; 386/117
(58) Field of Classification Search ............. 386/46, 386/107, 117, 125, 124, 120, 121
See application file for complete search history.

(56) References Cited

U.S. PATENT DOCUMENTS 5,153,730 A * 10/1992 Nagasaki et al. ......... 348/231.6
2008/0317443 A1 * 12/2008 Ando et al. ............... 386/126

FOREIGN PATENT DOCUMENTS

| JP | 02-121481 | 5/1990 |
| JP | 05-292445 | 11/1993 |
| JP | 11-076159 | 3/1999 |
| JP | 2000-092434 | 3/2000 |
| JP | 2002-152743 | 5/2002 |
| JP | 2004-072148 | 3/2004 |
| JP | 2004-221781 | 8/2004 |

* cited by examiner

*Primary Examiner*—Robert Chevalier
(74) *Attorney, Agent, or Firm*—Louis Woo

(57) ABSTRACT

Pictures are captured, and thereby moving-picture data is generated which represents a sequence of moving-picture fields. At least one picture is captured, and thereby still-picture data is generated which represents at least one still-picture frame corresponding in picture capture timing to one of the moving-picture fields represented by the moving-picture data. Components which correspond to said one of the moving-picture fields are removed from the still-picture data to generate supplementary still-picture information. Link information is generated which represents the picture capture timing correspondence between the still-picture frame and said one of the moving-picture fields. The moving-picture data, the supplementary still-picture information, and the link information are recorded on a recording medium.

12 Claims, 19 Drawing Sheets

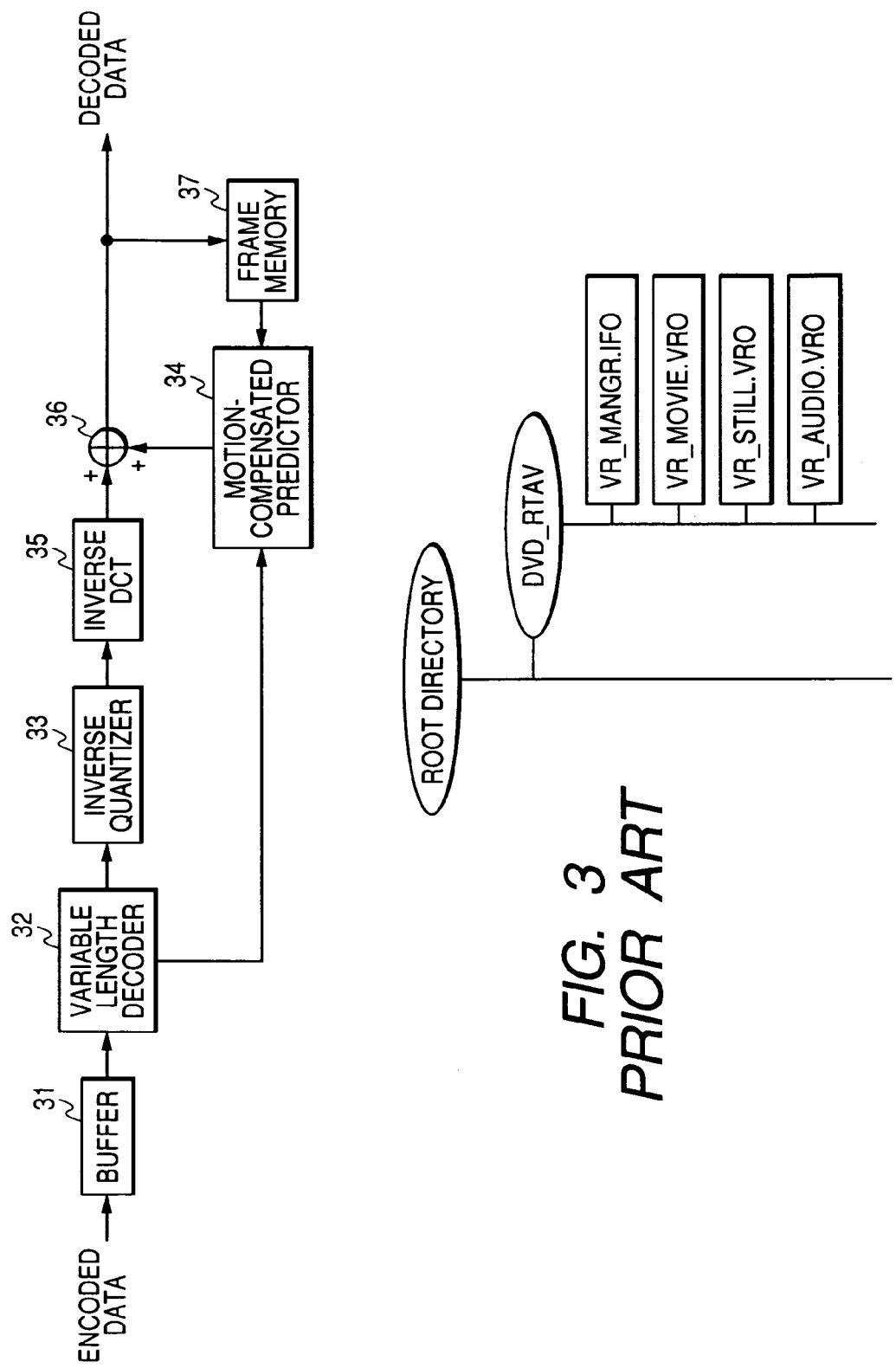

FIG. 6
PRIOR ART

| PGC_GI | | | PG_Ns | PROGRAM NUMBER |
|---|---|---|---|---|
| PGI#i | | | CI_SRP_Ns | CI_SRP NUMBER |
| | | | PG_TY | (OMITTED) |
| | | | C_Ns | CELL NUMBER IN PROGRAM |
| | | | PRM_TXTI | PRIMARY TEXT INFORMATION |
| | | | IT_TXT_SRPN | ITEM TEXT SEARCH POINTER NUMBER |
| | | | REP_PICTI | REPRESENTATIVE STILL PICTURE INFORMATION |
| CI_SRP#j | | | CI_TY | START ADDRESS OF M_CI#j |
| M_CI#j | M_C_GI | | C_TY | CELL TYPE |
| | | | M_VOBI_SRPN | (OMITTED) |
| | | | C_EPI_Ns | CELL ENTRY POINT NUMBER |
| | | | C_V_S_PTM | (OMITTED) |
| | | | C_V_E_PTM | (OMITTED) |
| | M_C_EPI#k | | EP_TY | ENTRY POINT TYPE (A OR B) |
| | | | EP_PTM | ENTRY POINT PLAYBACK TIME STAMP |
| | | | PRM_TXTI | PRIMARY TEXT INFORMATION (TYPE B ONLY) |

FIG. 10

| DATA FIELD | CONTENTS |
|---|---|
| V_PR_IFO_i() { | START OF V_PR_IFO |
| Size of this PR_IFO | SIZE OF PR_IFO |
| PR number (V_PRN) | VIDEO PROGRAM NUMBER |
| Video Group number (V_GRN) | VIDEO GROUP NUMBER RELATED TO PROGRAM |
| reserved | UNUSED |
| Playback Time | PLAYBACK TIME OF PROGRAM |
| Num_of_INDEX | INDEX NUMBER IN PROGRAM |
| Valid Start Address | VALID PLAYBACK START ADDRESS IN PROGRAM |
| Valid End Address | VALID PLAYBACK END ADDRESS IN PROGRAM |
| Rec Date | RECORDING DATE OF PROGRAM |
| Rec Time | RECORDING TIME OF PROGRAM |
| reserved | UNUSED |
| Character Set | CHARACTER SET USED BY PR AND Link text information |
| PR text information_size | SIZE OF PR text information |
| for(i=0; i< PR text information_size; i++) { PR_text_information } | PR text information |
| Link_text_information_size | SIZE OF Link text information |
| for(i=0; i< Link_text information_size; i++) { Link_text_information } | Link text information |
| Content type | CONTENT TYPE |
| Component type | DATA TYPE |
| Content nibble 1 | GENRE TYPE |
| Content nibble 2 | SUB GENRE TYPE |
| V_ATR | VIDEO ATTRIBUTE |
| A_ATR | AUDIO ATTRIBUTE |
| Content ID | CONTENT ID |
| User ID | USER ID |
| Password | PASSWORD |
| Delete_lock | DELETE LOCK FLAG |
| View_lock | PLAYBACK LOCK FLAG |
| reserved | UNUSED |
| } | END OF V_PR_IFO |

| DATA FIELD | CONTENTS |
|---|---|
| V_ATR () { | START OF V_ATR |
| Video_compression_mode | 00=MPEG1  01=MPEG2  10=JPEG  11=PNG |
| TV_system | 00=525/60  01=625/50 |
| Aspect_ratio | 00=4:3    01=16:9 |
| Horizontal_video_resolution | HORIZONTAL-DIRECTION PIXEL NUMBER |
| Vertical_video_resolution | VERTICAL-DIRECTION PIXEL NUMBER |
| } | END OF V_ATR |

FIG. 11

| DATA FIELD | CONTENTS |
|---|---|
| V_PR_IFO_i() { | START OF A_PR_IFO |
| Size of this PR_IFO | SIZE OF PR_IFO |
| PR number (A_PRN) | AUDIO PROGRAM NUMBER |
| Audio Group number (A_GRN) | AUDIO GROUP NUMBER RELATED TO PROGRAM |
| Track number (TKN) | TRACK NUMBER IN GROUP |
| Playback Time | PLAYBACK TIME OF PROGRAM |
| Num_of_INDEX | INDEX NUMBER IN PROGRAM |
| Valid Start Address | VALID START ADDRESS IN PROGRAM |
| Valid End Address | VALID END ADDRESS IN PROGRAM |
| Rec Date | RECORDING DATE OF PROGRAM |
| Rec Time | RECORDING TIME OF PROGRAM |
| reserved | UNUSED |
| Character Set | CHARACTER SET USED BY PR AND Link text information |
| PR text information_size | SIZE OF PR text information |
| for(i=0; i< PR text information_size; i++) { PR_text_information } | PR text information |
| Link_text_information_size | SIZE OF Link text information |
| for(i=0; i< Link_text information_size; i++) { Link_text_information } | Link text information |
| Content type | CONTENT TYPE |
| Component type | DATA TYPE |
| Content nibble 1 | GENRE TYPE |
| Content nibble 2 | SUB GENRE TYPE |
| reserved | UNUSED |
| A_ATR | AUDIO ATTRIBUTE |
| Content ID | CONTENT ID |
| User ID | USER ID |
| Password | PASSWORD |
| Delete_lock | DELETE LOCK FLAG |
| View_lock | PLAYBACK LOCK FLAG |
| reserved | UNUSED |
| } | END OF A_PR_IFO |

FIG. 12

| DATA FIELD | CONTENTS |
|---|---|
| S_PR_IFO_k() { | START OF S_PR_IFO |
| Size of this PR_IFO | SIZE OF PR_IFO |
| PR number (S_PRN) | STILL PICTURE PROGRAM NUMBER |
| Still picture Group number (S_GRN) | STILL PICTURE GROUP NUMBER RELATED TO PROGRAM |
| Linked_video_program_number | PR_number OF LINKED VIDEO |
| Linked_video_entry_time | TIME CODE OF LINKED VIDEO PICTURE |
| reserved | UNUSED |
| Rec Date | RECORDING DATE OF PROGRAM |
| Rec Time | RECORDING TIME OF PROGRAM |
| reserved | UNUSED |
| Character Set | CHARACTER SET USED BY PR AND Link text information |
| PR text information_size | SIZE OF PR text information |
| for(i=0; i< PR text information_size; i++) { PR_text_information } | PR text information |
| reserved | UNUSED |
| Content type | CONTENT TYPE |
| Component type | DATA TYPE |
| Content nibble 1 | GENRE TYPE |
| Content nibble 2 | SUB GENRE TYPE |
| reserved | UNUSED |
| S_ATR | STILL PICTURE ATTRIBUTE |
| Content ID | CONTENT ID |
| User ID | USER ID |
| Password | PASSWORD |
| Delete_lock | DELETE LOCK FLAG |
| View_lock | PLAYBACK LOCK FLAG |
| reserved | UNUSED |
| } | END OF S_PR_IFO |

| DATA FIELD | CONTENTS |
|---|---|
| S_ATR () { | START OF S_ATR |
| Video_compression_mode | 00=MPEG1 01=MPEG2 10=JPEG 11=PNG |
| TV_system | 00=525/60 01=625/50 |
| Aspect_ratio | 00=4:3 01=16:9 |
| supplement_info | 00=RESERVED 01=TOP FIELD 10=BOTTOM FIELD 11=OVER SAMPLE |
| Horizontal_video_resolution | HORIZONTAL-DIRECTION PIXEL NUMBER |
| Vertical_video_resolution | VERTICAL-DIRECTION PIXEL NUMBER |
| } | END OF S_ATR |

FIG. 13

| DATA FIELD | CONTENTS |
|---|---|
| PL_IFO_p() { | START OF PL_IFO |
| Size of this PL_IFO | SIZE OF PL_IFO |
| PL number | PLAY LIST NUMBER |
| reserved | UNUSED |
| Playback Time | PLAYBACK TIME OF PLAY LIST |
| num_of_ud_programs | USER DEFINED PROGRAM NUMBER IN PLAY LIST |
| for(i=0; i<num_of_ud_programs; j++) { | |
| UD_PR_mode | RECORDED PROGRAM FLAG<br>000b: VIDEO PROGRAM ONLY<br>001b: AUDIO PROGRAM ONLY<br>010b: STILL PICTURE PROGRAM ONLY<br>011b: AUDIO AND STILL PICTURE PROGRAMS<br>OTHERS: UNUSED |
| if(UD_PR_mode == '000b') { | |
| num_of_V_PRs | NUMBER OF PLAYBACK VIDEO PROGRAMS |
| for(t=0; t<num_of_V_PRs; t++) { | |
| PR number | VIDEO PROGRAM NUMBER |
| Start Address | PLAYBACK START ADDRESS |
| End Address | PLAYBACK END ADDRESS |
| } | |
| } | |
| if(UD_PR_mode == '000b' or '011b') { | |
| num_of_A_PRs | NUMBER OF PLAYBACK AUDIO PROGRAMS |
| for(t=0; t<num_of_A_PRs; t++) { | |
| PR number | AUDIO PROGRAM NUMBER |
| Start Address | PLAYBACK START ADDRESS |
| End Address | PLAYBACK END ADDRESS |
| } | |
| } | |
| if(UD_PR_mode == '010b' or '011b') { | |
| num_of_S_PRs | NUMBER OF PLAYBACK STILL PICTURE PROGRAMS |
| Display_mode | STILL PICTURE DISPLAY MODE |
| Display_duration | STILL PICTURE DISPLAY DURATION |
| for(t=0; t<num_of_S_PRs; t++) { | |
| PR number | STILL PICTURE PROGRAM NUMBER |
| } | |
| } | |
| } | |
| Making Date | MAKING DATE OF PLAY LIST |
| Making Time | MAKING TIME OF PLAY LIST |
| reserved | UNUSED |
| Character Set | CHARACTER SET USED BY PL AND Link teext information |
| PL text information_size | SIZE OF PL text information |
| for(i=0; i< PL text information_size; i++)<br>PL_text_information | PL text information |
| Link_text_information_size | SIZE OF Link text information |
| for(i=0; i< Link_text information_size; i++)<br>Link_text_information | Link text information |
| reserved | UNUSED |
| User ID | USER ID |
| Password | PASSWORD |
| Delete_lock | DELETE LOCK FLAG |
| View_lock | PLAYBACK LOCK FLAG |
| reserved | UNUSED |
| } | END OF PL_IFO |

FIG. 14

| DATA FIELD | CONTENTS |
|---|---|
| GENERAL_IFO0 { | START OF GENERAL_IFO |
| System_ID | FORMAT ID |
| Version_num | FORMAT VERSION NUMBER |
| Size of this TOTAL_MAIN_IFO | SIZE OF TOTAL_MAIN_IFO |
| CNTNT_IFO Start address | START ADDRESS OF CNTNT_IFO |
| STATUS_IFO Start address | START ADDRESS OF STATUS_IFO |
| } | END OF GENERAL_IFO |

FIG. 18

| SYNTAX | BIT NUMBER |
|---|---|
| Picture () { | |
|     picture_start_code | 32 |
|     Temporal_reference | 10 |
|     picture_coding_type | 3 |
|     vbv_delay | 16 |
|     if ( (picture_coding_type == 2) \|\| | |
|         (picture_coding_type == 3) ) { | |
|             full_pel_forward_vector | 1 |
|             forward_f_code | 3 |
|     } | |
|     if ( picture_coding_type == 3) { | |
|         full_pel_backward_vector | 1 |
|         backward_f_code | 3 |
|     } | |
|     while ( nextbits () == '1' ) { | |
|         extra_bit_picture | 1 |
|         extra_information_picture | 8 |
|     } | |
|     extra_bit_picture | 1 |
|     next_start_code () | |
| | |
|     if (nextbits () == extension_start_code ) { | |
|         extension_start code | 32 |
|         while ( nextbits () != '0000 0000 0000 | |
|             0000 0000 0001' ) { | |
|             Picture_extension_data | 8 |
|         } | |
|         Next_start_code () | |
|     } | |
|     if ( nextbits () == user_data_start_code ) { | |
|         User_data_start code | 32 |
|         While ( nextbits () != '0000 0000 0000 | |
|             0000 0000 0001' ) { | |
|             user_data | 8 |
|         } | |
|         Next_start_code () | |
|     } | |
|     do { | |
|         Slice () | |
|     } while ( nextbits () == slice_start_code ) | |
| | |
| } | |

INFORMATION RECORDING APPARATUS, INFORMATION REPRODUCING APPARATUS, AND RELATED COMPUTER PROGRAMS

BACKGROUND OF THE INVENTION

1. Field of the Invention

This invention generally relates to an information recording apparatus, an information reproducing apparatus, an information recording method, an information reproducing method, and computer programs related thereto. This invention particularly relates to a method and an apparatus for recording information representative of moving pictures and at least one still picture on a recording medium, a method and an apparatus for reproducing information representative of moving pictures and at least one still picture from a recording medium, and computer programs related thereto.

2. Description of the Related Art

Japanese patent application publication number 5-292445/1993 discloses a video magnetic recording apparatus including first and second image pickup systems. The first image pickup system is an optical system provided with a wide angle lens. The second image pickup system is an optical system provided with a zoom lens. A video signal obtained by the first image pickup system and a video signal obtained by the second image pickup system are multiplexed on a time sharing basis before being recorded on a common magnetic recording medium. Thus, video signals of plural types, that is, a wide angle type and a zoom type, are recorded on a single recording medium.

Japanese patent application publication number 2004-72148 discloses an audio-visual data recording apparatus including a prism, a first CCD device for capturing low-resolution moving pictures, and a second CCD device for capturing high-resolution still pictures. The prism splits an incoming light beam into two beams applied to the first and second CCD devices respectively. The first CCD device generates a video signal representing a stream of moving pictures. The second CCD device generates a video signal representing an updatable still picture. The moving-picture signal is compressed according to the MPEG standards. The still-picture signal is compressed according to the JPEG standards. The compressed moving-picture signal and the compressed still-picture signal are simultaneously recorded on a common memory card.

Japanese patent application publication number 11-76159/1999 discloses an imaging apparatus including a semitransparent mirror and first and second CCD devices of a same structure. The semitransparent mirror splits an incoming light beam into two beams applied to the first and second CCD devices respectively. The positions of the first and second CCD devices relative to the incident light beams are positionally offset from each other by half-pixel intervals in horizontal and vertical directions. The first and second CCD devices generate first and second video signals, respectively. First pixels represented by the first video signal, second pixels represented by the second video signal, and third pixels or missing pixels compose a complete high-resolution image. A video signal segment representative of one of the missing pixels is generated from segments of the first and second video signals which represent pixels neighboring the missing pixel in question on an interpolation basis. The first video signal, the second video signal, and the video signal segments representative of the missing pixels are combined to form a high-resolution video signal.

Japanese patent application publication number 2002-152743 discloses an apparatus for decoding a moving-picture signal which includes a decoder, a CPU, a display, and a timer. The decoder receives input encoded video data from a recording medium or a communication line, and decodes the received video data for every field while being controlled by the CPU. The decoded video data is fed to the display via a memory. The display has a section for generating second video data from the decoded video data. The second video data represents an updatable high-quality still picture which remains stationary regardless of an inter-field picture motion. The display has a selector for choosing either the decoded video data or the second video data as output video data. The selector responds to operation of the timer. The timer is controlled by the CPU. Under normal conditions, the timer is reset by the CPU for every frame so that the selector continues to choose the decoded video data. In the event that the decoding of the input video data for a frame is unsuccessful due to a damage to the recording medium or a communication fault, the CPU does not reset the timer so that the selector chooses the second video data instead of the decoded video data.

In the previously-mentioned apparatus of Japanese patent application publication number 2004-72148, the moving-picture signal and the still-picture signal are independently recorded on the memory card although they originate from a same scene or scenes. Therefore, the total number of bits composing the recorded moving-picture and still-picture signals tends to be relatively great.

SUMMARY OF THE INVENTION

It is a general object of this invention to reduce the total number of bits composing recorded moving-picture and still-picture signals without degrading picture qualities.

It is a first specific object of this invention to provide an improved apparatus for recording information representative of moving pictures and at least one still picture on a recording medium.

It is a second specific object of this invention to provide an improved apparatus for reproducing information representative of moving pictures and at least one still picture from a recording medium.

It is a third specific object of this invention to provide an improved computer program for recording information representative of moving pictures and at least one still picture on a recording medium.

It is a fourth specific object of this invention to provide an improved computer program for reproducing information representative of moving pictures and at least one still picture from a recording medium.

It is a fifth specific object of this invention to provide an improved method of recording information representative of moving pictures and at least one still picture on a recording medium.

It is a sixth specific object of this invention to provide an improved method of reproducing information representative of moving pictures and at least one still picture from a recording medium.

A first aspect of this invention provides an information recording apparatus comprising first means for capturing pictures and thereby generating moving-picture data representing a sequence of moving-picture fields; second means for capturing at least one picture and thereby generating still-picture data representing at least one still-picture frame corresponding in picture capture timing to one of the moving-picture fields represented by the moving-picture data; third means for removing components, which correspond to said one of the moving-picture fields, from the still-picture data generated by the second means to generate supplementary still-picture information; fourth means for generating link information representing the picture capture timing correspondence between the still-picture frame and said one of the moving-picture fields; and fifth means for recording the moving-picture data generated by the first means, the supplementary still-picture information generated by the third means, and the link information generated by the fourth means on a recording medium.

A second aspect of this invention provides an information recording apparatus comprising first means for capturing pictures and thereby generating moving-picture data representing a sequence of moving-picture frames having a first predetermined pixel-number-based size; second means for capturing at least one picture and thereby generating still-picture data representing at least one still-picture frame corresponding in picture capture timing to one of the moving-picture frames represented by the moving-picture data, the still-picture frame having a second predetermined pixel-number-based size greater than the first predetermined pixel-number-based size; third means for oversampling a portion of the moving-picture data which represents said one of the moving-picture frames to generate data representing a frame having a size equal to the second predetermined pixel-number-based size; fourth means for subtracting the data generated by the third means from the still-picture data generated by the second means to generate supplementary still-picture information; fifth means for generating link information representing the picture capture timing correspondence between the still-picture frame and said one of the moving-picture frames; and sixth means for recording the moving-picture data generated by the first means, the supplementary still-picture information generated by the fourth means, and the link information generated by the fifth means on a recording medium.

A third aspect of this invention provides an information reproducing apparatus for reproducing moving-picture data, supplementary still-picture information, and link information from a recording medium which have been recoded by the information recording apparatus of the first aspect of this invention. The information reproducing apparatus comprises first means for reading out the supplementary still-picture information from the recording medium; second means for reading out the link information from the recording medium; third means for identifying one of moving-picture fields represented by the moving-picture data in response to the link information read out by the second means, the identified moving-picture field corresponding in picture capture timing to a still picture related to the supplementary still-picture information read out by the first means; fourth means for reading out a portion of the moving-picture data from the recording medium which represents the identified moving-picture field; and fifth means for combining the supplementary still-picture information read out by the first means and the moving-picture data portion read out by the fourth means to generate still-picture data representing an original still picture.

A fourth aspect of this invention provides an information reproducing apparatus for reproducing moving-picture data, supplementary still-picture information, and link information from a recording medium which have been recoded by the information recording apparatus of the second aspect of this invention. The information reproducing apparatus comprises first means for reading out the supplementary still-picture information from the recording medium; second means for reading out the link information from the recording medium; third means for identifying one of moving-picture frames represented by the moving-picture data in response to the link information read out by the second means, the identified moving-picture frame corresponding in picture capture timing to a still picture related to the supplementary still-picture information read out by the first means; fourth means for reading out a portion of the moving-picture data from the recording medium which represents the identified moving-picture frame; fifth means for oversampling the moving-picture data portion read out by the fifth means to generate second moving-picture data; and sixth means for combining the supplementary still-picture information read out by the first means and the second moving-picture data generated by the fifth means to generate still-picture data representing an original still picture.

A fifth aspect of this invention provides a computer program for enabling a computer and its peripheral devices to have the functions of capturing pictures and thereby generating moving-picture data representing a sequence of moving-picture fields; capturing at least one picture and thereby generating still-picture data representing at least one still-picture frame corresponding in picture capture timing to one of the moving-picture fields represented by the moving-picture data; removing components, which correspond to said one of the moving-picture fields, from the still-picture data to generate supplementary still-picture information; generating link information representing the picture capture timing correspondence between the still-picture frame and said one of the moving-picture fields; and recording the moving-picture data, the supplementary still-picture information, and the link information on a recording medium.

A sixth aspect of this invention provides a computer program for enabling a computer and its peripheral devices to have the functions of capturing pictures and thereby generating moving-picture data representing a sequence of moving-picture frames having a first predetermined pixel-number-based size; capturing at least one picture and thereby generating still-picture data representing at least one still-picture frame corresponding in picture capture timing to one of the moving-picture frames represented by the moving-picture data, the still-picture frame having a second predetermined pixel-number-based size greater than the first predetermined pixel-number-based size; oversampling a portion of the moving-picture data which represents said one of the moving-picture frames to generate oversampled data representing a frame having a size equal to the second predetermined pixel-number-based size; subtracting the oversampled data from the still-picture data to generate supplementary still-picture information; generating link information representing the picture capture timing correspondence between the still-picture frame and said one of the moving-picture frames; and recording the moving-picture data, the supplementary still-picture information, and the link information on a recording medium.

A seventh aspect of this invention provides a computer program for enabling a computer and its peripheral devices to have the functions of reading out supplementary still-picture information from a recording medium; reading out link information from the recording medium; identifying one of moving-picture fields represented by moving-picture data in response to the read-out link information, the identified moving-picture field corresponding in picture capture timing to a still picture related to the read-out supplementary still-picture information; reading out a portion of the moving-picture data from the recording medium which represents the identified moving-picture field; and combining the read-out supplementary still-picture information and the read-out moving-picture data portion to generate still-picture data representing an original still picture.

An eighth aspect of this invention provides a computer program for enabling a computer and its peripheral devices to have the functions of reading out supplementary still-picture information from a recording medium; reading out link information from the recording medium; identifying one of moving-picture frames represented by moving-picture data in response to the read-out link information, the identified moving-picture frame corresponding in picture capture timing to a still picture related to the read-out supplementary still-picture information; reading out a portion of the moving-picture data from the recording medium which represents the identified moving-picture frame; oversampling the read-out moving-picture data portion to generate second moving-picture data; and combining the read-out supplementary still-picture information and the second moving-picture data to generate still-picture data representing an original still picture.

A ninth aspect of this invention provides a method comprising the steps of capturing pictures and thereby generating moving-picture data representing a sequence of moving-picture fields; capturing at least one picture and thereby generating still-picture data representing at least one still-picture frame corresponding in picture capture timing to one of the moving-picture fields represented by the moving-picture data; removing components, which correspond to said one of the moving-picture fields, from the still-picture data to generate supplementary still-picture information; generating link information representing the picture capture timing correspondence between the still-picture frame and said one of the moving-picture fields; and recording the moving-picture data, the supplementary still-picture information, and the link information on a recording medium.

A tenth aspect of this invention provides a method comprising the steps of capturing pictures and thereby generating moving-picture data representing a sequence of moving-picture frames having a first predetermined pixel-number-based size; capturing at least one picture and thereby generating still-picture data representing at least one still-picture frame corresponding in picture capture timing to one of the moving-picture frames represented by the moving-picture data, the still-picture frame having a second predetermined pixel-number-based size greater than the first predetermined pixel-number-based size; oversampling a portion of the moving-picture data which represents said one of the moving-picture frames to generate oversampled data representing a frame having a size equal to the second predetermined pixel-number-based size; subtracting the oversampled data from the still-picture data to generate supplementary still-picture information; generating link information representing the picture capture timing correspondence between the still-picture frame and said one of the moving-picture frames; and recording the moving-picture data, the supplementary still-picture information, and the link information on a recording medium.

An eleventh aspect of this invention provides a method comprising the steps of reading out supplementary still-picture information from a recording medium; reading out link information from the recording medium; identifying one of moving-picture fields represented by moving-picture data in response to the read-out link information, the identified moving-picture field corresponding in picture capture timing to a still picture related to the read-out supplementary still-picture information; reading out a portion of the moving-picture data from the recording medium which represents the identified moving-picture field; and combining the read-out supplementary still-picture information and the read-out moving-picture data portion to generate still-picture data representing an original still picture.

A twelfth aspect of this invention provides a method comprising the steps of reading out supplementary still-picture information from a recording medium; reading out link information from the recording medium; identifying one of moving-picture frames represented by moving-picture data in response to the read-out link information, the identified moving-picture frame corresponding in picture capture timing to a still picture related to the read-out supplementary still-picture information; reading out a portion of the moving-picture data from the recording medium which represents the identified moving-picture frame; oversampling the read-out moving-picture data portion to generate second moving-picture data; and combining the read-out supplementary still-picture information and the second moving-picture data to generate still-picture data representing an original still picture.

This invention has advantages indicated below. In this invention, the moving-picture data is recorded on the recording medium. The still-picture data is compressed before being recorded on the recording medium as the supplementary still-picture information which can be supplemented by a corresponding portion of the moving-picture data. The compression of the still-picture data is performed as follows. According to a first example, components corresponding to a field represented by the portion of the moving-picture data are removed from the still-picture data to generate the supplementary still-picture information. According to a second example, data resulting from oversampling the portion of the moving-picture data is subtracted from the still-picture data to generate the supplementary still-picture information. Data representing an original still picture can be reproduced by reading out the supplementary still-picture information and the corresponding portion of the moving-picture data from the recording medium, and then combining the read-out supplementary still-picture information and the read-out portion of the moving-picture data. Since the supplementary still-picture information results from the compression of the still-picture data, the total amount of moving-picture information and still-picture information recorded on the recording medium can be reduced accordingly. In addition, the recording medium can be efficiently used.

BRIEF DESCRIPTION OF THE DRAWINGS

FIG. 2 is a block diagram of a prior-art apparatus for decoding a moving-picture bit stream generated by the prior-art apparatus of FIG. 1.

FIG. 3 is a diagram of a prior-art directory and file structure on a DVD-RW or a DVD-RAM.

FIG. 6 is a diagram showing the contents of prior-art program chain information (PGCI) described in the original PGC or the user defined PGC.

FIG. 10 is a table showing an example of the data field and the contents of a moving-picture program information structural body V_PR_IFO_i.

FIG. 11 is a table showing an example of the data field and the contents of an audio program information structural body A_PR_IFO_j.

FIG. 12 is a table showing an example of the data field and the contents of a still-picture program information structural body S_PR_IFO_k.

FIG. 13 is a table showing an example of the data field and the contents of a play list information structural body PL_IFO_p.

FIG. 14 is a table showing an example of the contents of GENERAL_IFO in FIG. 9.

FIG. 18 is a table showing the syntax of one picture in an MPEG-2 video layer.

DETAILED DESCRIPTION OF THE INVENTION

Prior-art apparatuses and recording mediums will be explained below for a better understanding of this invention.

MPEG-2 (Moving Picture Experts Group Phase 2) means international standards for a technique of efficiently encoding a moving-picture signal. The MPEG-2 standards prescribe motion-compensated prediction and transform-based encoding which allow data compression.

Figure 1:
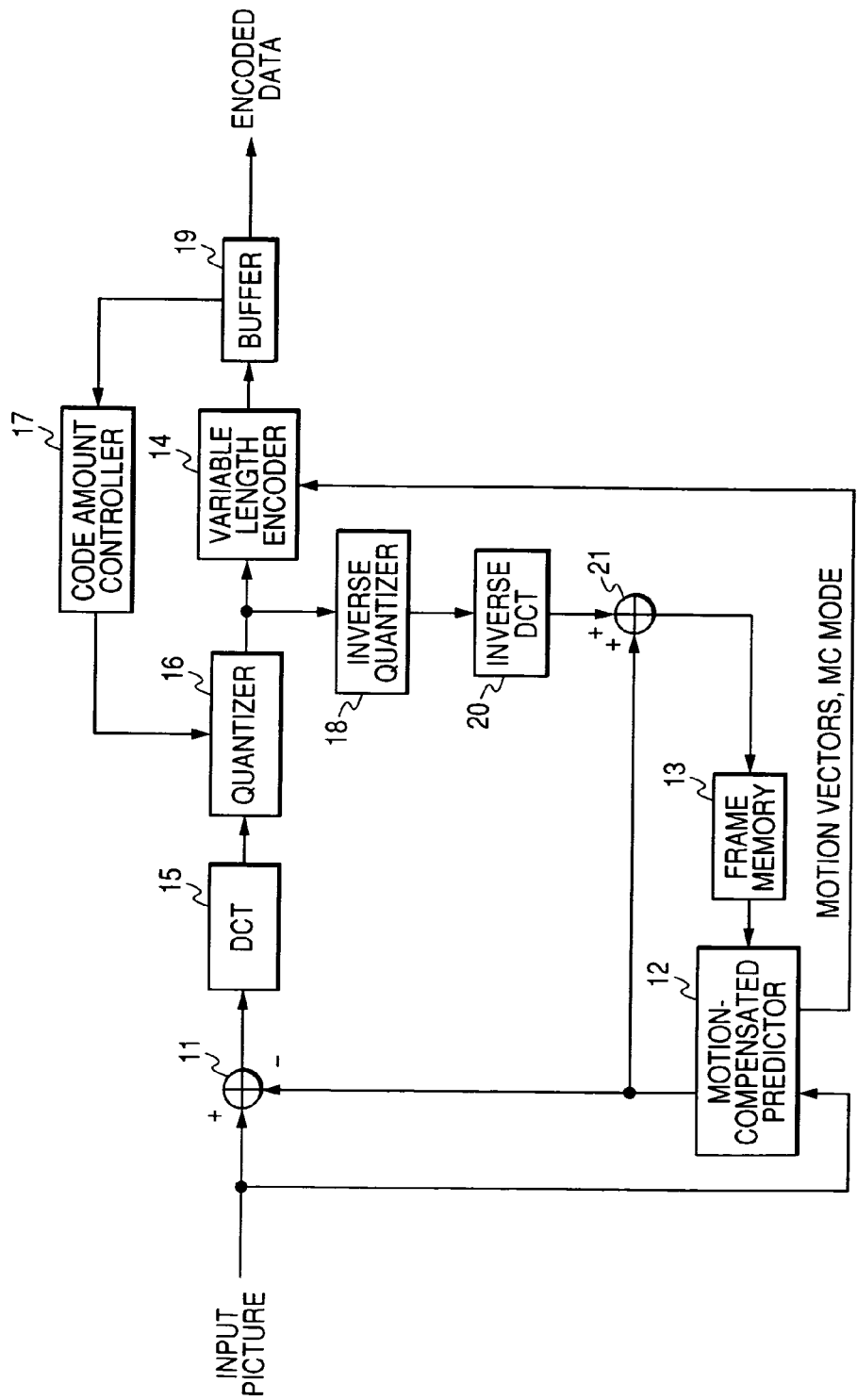
FIG. 1 is a block diagram of a prior-art apparatus for encoding a moving-picture signal in conformity with the MPEG-2 standards.

FIG. 1 shows a prior-art apparatus for encoding a moving-picture signal in conformity with the MPEG-2 standards. Every frame related to an input moving-picture signal is divided into macroblocks of 16 pixels by 16 pixels. The prior-art apparatus of FIG. 1 processes the input moving-picture signal on a macroblock-by-macroblock basis.

The input moving-picture signal represents a stream of pictures of three different types which include I pictures (intra-coded pictures), P pictures (forward predictive coded pictures), and B pictures (bidirectionally predictive coded pictures). Normally, one GOP (group of pictures) starts from an I picture and ends at a picture immediately preceding a next I picture. Generally, one GOP has about 15 pictures. Preferably, the order in which pictures are arranged is changed from the original to allow a proper encoding procedure including bidirectional prediction.

The prior-art apparatus of FIG. 1 operates as follows. A subtracter 11 subtracts a predictive picture from an input picture represented by the input moving-picture signal, and thereby generates a predictive error picture. The predictive picture is fed from a motion-compensated predictor 12. Prediction implemented by the prior-art apparatus of FIG. 1 is in a direction which can change among three modes, that is, a direction from the past, a direction from the future, and a direction from both the past and the future. One of the prediction modes can be selected and used for each macroblock of the input moving-picture signal. The used prediction direction is decided by the type of the input picture. Every macroblock of an input P picture undergoes one of two modes of encoding, that is, (1) encoding with prediction from the past and (2) intra-macroblock encoding without prediction. Every macroblock of an input B picture undergoes one of four modes of encoding, that is, (1) encoding with prediction from the future, (2) encoding with prediction from the past, (3) encoding with prediction from both the past and the future, and (4) intra-macroblock encoding without prediction. On the other hand, every macroblock of an input I picture undergoes intra-macroblock encoding without prediction.

The motion-compensated predictor 12 implements motion compensation for the input picture relative to a reference picture fed from a frame memory 13. The motion compensation includes a step of performing pattern matching between the macroblocks of the input picture and the macroblocks of the reference picture, a step of detecting motion vectors (motion amounts) at a half-pel precision in response to the results of the pattern matching, and a step of shifting one or ones of the macroblocks by the detected motion amounts to convert the reference picture into the predictive picture. The motion vectors are in a horizontal direction and a vertical direction. The motion-compensated predictor 12 notifies the motion vectors and an MC (motion compensation) mode to a variable-length encoder 14. The MC mode indicates where the implemented prediction is from. The motion vectors and the MC mode will be transmitted as additional information with respect to the present macroblock.

A DCT (discrete cosine transform) device 15 receives the predictive error picture from the subtracter 11. The DCT device 15 divides every macroblock of the predictive error picture into four sub-blocks of 8 pixels by 8 pixels. The DCT device 15 subjects each sub-block to two-dimensional discrete cosine transform, thereby generating DCT coefficients. The DCT device 15 outputs the DCT coefficients to a quantizer 16.

The device 16 quantizes the DCT coefficients in response to a quantization scale factor to get quantized DCT coefficients. The quantization scale factor depends on a code amount error notified by a code amount controller 17. Specifically, the quantizer 16 uses a quantization matrix of 8 by 8 elements resulting from weighting two-dimensional 8-by-8 frequencies in accordance with visual sensation. The quantizer 16 multiplies the quantization matrix by the quantization scale factor to get quantization values. Then, the quantizer 16 divides the DCT coefficients by the quantization values to get the quantized DCT coefficients. The quantizer 14 outputs the quantized DCT coefficients to the variable-length encoder 14 and an inverse quantizer 18.

The variable-length encoder 14 converts the quantized DCT coefficients, the motion vectors, and the MC mode into words of a prescribed variable-length code. Specifically, the variable-length encoder 14 uses DPCM (differential pulse code modulation) for the DC (direct current) component in the quantized DCT coefficients. The variable-length encoder 14 scans the two-dimensional array of the AC (alternating current) components in the quantized DCT coefficients along a zigzag path from a low frequency to a high frequency, and implements the Huffman encoding of the scanned AC components. The variable-length encoder 14 sequentially outputs the variable-length code words to a buffer 19. The buffer 19 temporarily stores the variable-length code words before sequentially outputting them in properly-adjusted time base as an output bit stream (output encoded data).

The buffer 19 notifies the code amount controller 17 of the actual amount (the number of bits) of the encoded data outputted from the variable-length encoder 14 for every macroblock. The code amount controller 17 calculates an error between the actual code amount and a target code amount. The code amount controller 17 notifies the calculated code amount error to the quantizer 16. The quantizer 16 adjusts the used quantization scale factor in response to the code amount error so that code amount control will be carried out.

For every input I or P picture, the inverse quantizer 18 and an inverse DCT device 20 cooperate to implement local decoding. Specifically, the device 18 inversely quantizes the quantized DCT coefficients to recover the original DCT coefficients. The inverse quantizer 18 outputs the recovered DCT coefficients to the inverse DCT device 20. The device 20 subjects the recovered DCT coefficients to inverse discrete cosine transform, thereby recovering each original sub-block. The inverse DCT device 20 combines four recovered sub-blocks into each macroblock of a decoded predictive error picture. The inverse DCT device 20 outputs the decoded predictive error picture to an adder 21. The adder 21 receives the predictive picture from the motion-compensated predictor 12. The device 21 adds the decoded predictive error picture and the predictive picture to generate a local decoded picture. The adder 21 outputs the local decoded picture to the frame memory 13. The frame memory 13 temporarily stores the local decoded picture as a reference picture consisting of a local decoded I or P picture. The frame memory 13 feeds the reference picture to the motion-compensated predictor 12.

FIG. 2 shows a prior-art apparatus for decoding a moving-picture bit stream generated by the prior-art apparatus of FIG. 1. The prior-art apparatus of FIG. 2 operates as follows. An input moving-picture bit stream is buffered by a buffer 31 before being fed to a variable-length decoder 32. Basically, the variable-length decoder 32 and following devices carry out signal processing on a macroblock-by-macroblock basis.

The device 32 implements the variable-length decoding of the input moving-picture bit stream to recover quantized DCT coefficients, motion vectors, and an MC mode for every macroblock. The quantized DCT coefficients consist of a DC component and AC components. The variable-length decoder 32 places the AC components in an 8-by-8 matrix along a zigzag order from a low frequency to a high frequency. The variable-length decoder 32 outputs the quantized DCT coefficients to an inverse quantizer 33. The variable-length decoder 32 notifies the motion vectors and the MC mode to a motion-compensated predictor 34.

The device 33 inversely quantizes the quantized DCT coefficients in response to a quantization matrix to recover the original DCT coefficients. The inverse quantizer 33 outputs the recovered DCT coefficients to an inverse DCT device 35. The device 35 subjects the recovered DCT coefficients to inverse discrete cosine transform, thereby recovering each original sub-block. The inverse DCT device 35 combines four recovered sub-blocks into each macroblock of a decoded predictive error picture. The inverse DCT device 35 outputs the decoded predictive error picture to an adder 36.

The adder 36 receives a predictive picture from the motion-compensated predictor 34. The device 36 adds the decoded predictive error picture and the predictive picture to generate a decoded picture. The adder 36 outputs the decoded picture to an external device as decoded data. In the case where the decoded picture is an I or P picture, the adder 36 outputs the decoded picture to a frame memory 37. The frame memory 37 temporarily stores the decoded picture as a reference picture consisting of a decoded I or P picture. The frame memory 37 feeds the reference picture to the motion-compensated predictor 34. The motion-compensation predictor 34 generates the predictive picture from the reference picture in response to the motion vectors and the MC mode.

DVDs (digital versatile discs) are of various types such as a DVD-ROM, a DVD-RW, and a DVD-RAM. There are DVD video recording (DVD-VR) standards for recording moving-picture data on a DVD-RW or a DVD-RAM. The DVD-VR standards prescribe that the recording of the moving-picture data should be on a VOB-by-VOB basis. The VOB means a video object that is a unit file containing moving-picture data. A moving-picture stream can be divided into arbitrary time portions to which VOBs are assigned respectively. The VOBs enable the time portions of the moving-picture stream to be discriminated from each other.

A program chain (PGC) is used to reproduce recorded VOBs from a disc. The PGC describes the sequence of playback of the VOBs. A DVD player refers to the PGC and successively reproduces the VOBs in the described playback sequence.

An original PGC describes the sequence of playback of all VOBs in a disc which agrees with the order in which the VOBs have been recorded. A user defined PGC describes the sequence of playback of ones selected from all VOBs in a disc by a user.

Only one original PGC exists on a disc while a plurality of user defined PGCs can exist thereon. Accordingly, even when there are plural users for one disc, different user defined PGCs are made by the respective users and thereby the disc can be edited. Regarding a disc, one user can make different user defined PGCs according to user's preference to edit the disc.

FIG. 3 shows a prior-art directory and file structure on a DVD-RW or a DVD-RAM according to the DVD-VR standards. As shown in FIG. 3, a DVD_RTAV directory exists under a root directory. A VR_MANGR.IFO file located under the DVD_RTAV directory is used for storing all recording and playback management data. An original PGC and user defined PGCs are described in the VR_MANGR.IFO file. A VR_MOVIE.VRO file, a VR_STILL.VRO file, and a VR_AUDIO.VRO file are also located under the DVD_RTAV directory. The VR_MOVIE.VRO file is loaded with the main body of moving-picture data. The VR_STILL.VRO file is loaded with the main body of still-picture data. The VR_AUDIO.VRO file is loaded with the main body of audio data.

In such a way, actual data (moving-picture data, still-picture data, and audio data) and recording and playback management data are recorded on a disc while they are separate from each other. This design allows an arbitrary sequence of playback of VOBs to be set according to a user defined PGC without changing the actual moving-picture, still-picture, and audio data.

Generally, still pictures represented by data in the VR_STILL.VRO file are MPEG intra-coded pictures.

Figure 4:
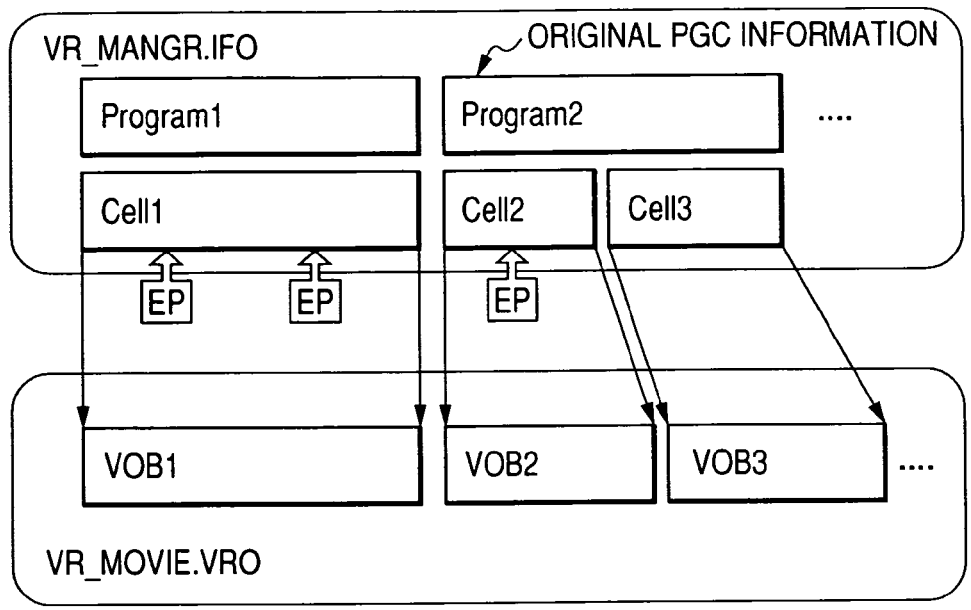
FIG. 4 is a diagram of a structure of a prior-art original PGC.

FIG. 4 shows a structure of a prior-art original PGC. A DVD conforming with the DVD-VR standards is referred to as a DVD-VR. When moving-picture data representing different sequences of moving pictures is recorded on a DVD-VR, programs for referring to portions of the recorded moving-picture data which correspond to the respective moving-picture sequences are described in the original PGC. Furthermore, regarding each of the programs, cells for dividing the moving-picture data corresponding to the present program are described in the original PGC while being related with the present program. Generally, in the case where a pause is taken during the recording or in the case where an editing process after the recording deletes a recorded data portion corresponding to a midway part of a program, divided cells are created and the boundary therebetween coincides with the position of the pause or the deletion. The cells refer to VOBs having the corresponding divided portions of the moving-picture data, respectively. The programs and the cells are recording and playback management data concerning the original PGC.

VOBs have respective portions of moving-picture data which are referred to by cells. The VOBs are recorded as a program stream conforming with the MPEG-2 system standards.

With reference to FIG. 4, moving-picture data which is first recorded on the disc forms a VOB "1". A program "1" and a cell "1" which refer to the VOB 1 are described in the original PGC. Thereafter, each time a VOB is additionally recorded, a program and a cell (a program "2", a program "3", . . . , a cell "1", a cell "2", . . . ) which refer to the VOB are described in the original PGC. In the case where a pause is taken during the recording of one program, a plurality of divided VOBs are formed and thus a plurality of cells referring to the divided cells are described in the program. In FIG. 4, the program "2" is divided into portions corresponding to cells "2" and "3" which refer to VOBs "2" and "3" respectively.

According to the original PGC, all VOBs corresponding to all the programs or the cells described therein (that is, all the programs or the cells stored in the disc) can be played back in the sequence which agrees with the order in which the VOBs have been recorded. When a user designates a specified program on the original PGC, only VOBs the designated program refers to can be played back.

Figure 5:
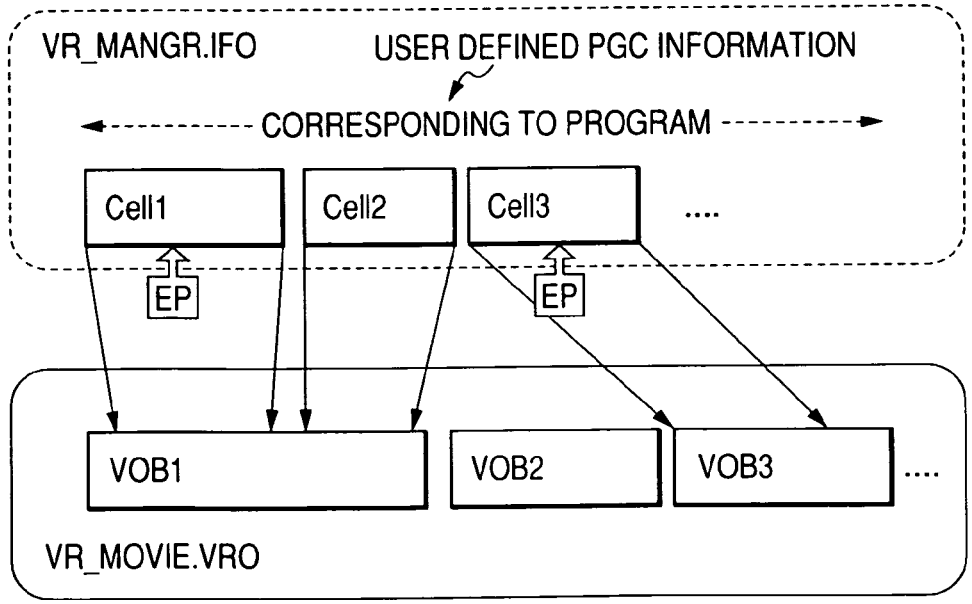
FIG. 5 is a diagram of a structure of a prior-art user defined PGC.

FIG. 5 shows a structure of a prior-art user defined PGC. In general, the user defined PGC can refer to ones or all of VOBs the original PGC refers to. Each cell in the user defined PGC is in or out of one-to-one correspondence with a VOB, and can refer to only a portion of a VOB or at least portions of two successive VOBs. For example, the cell is suited to refer to only a desired-scene-indicating portion of a VOB which is generated by deleting an undesired-scene-indicating portion or a commercial-indicating portion therefrom. The cell is also suited for the playback of a combination of portions of two or more different programs.

A layer corresponding to programs is absent from the user defined PGC. In other words, one user defined PGC corresponds to one program stated by the original PGC.

FIG. 6 shows the contents of prior-art program chain information (PGCI) described in an original PGC or a user defined PGC. The PGCI consists of the following pieces:

PGC_GI: general information about the present PGC;
PGI: program information corresponding to each program ID number (defined for the original PGC only, not defined for the user defined PGC);
CI_SRP: search pointer for each cell information piece in the present PGC; and
M_CI: each cell information piece in the case of moving-picture cells (replaced by S_CI in the case of still-picture cells).

The PGC_GI has PG_Ns indicating the number of programs in the present PGC, and CI_SRP_Ns indicating the number of CI_SRP. In the case of the user defined PGC, the layer corresponding to programs is absent and hence the PG_Ns is set to "0".

There are PGIs, the number of which is equal to that indicated by the PG_Ns. The PGIs are discriminated from each other by a variable number (integer) "i" suffixed to each of them. Each PGI has C_Ns indicating the number of cells in the related program, PRM_TXTI representing primary text information about the related program, IT_TXT_SRPN indicating a search pointer number for item text information (recorded as a data structure in the VR_MANGR.IFO which differs from the PGCI) concerning the related program, and REP_PICTI indicating representative still-picture information for designating the position of a still picture typical of the related program.

There are CI_SRPs, the number of which is equal to the number indicated by the CI_SRP_Ns. The CI_SRPs are discriminated from each other by a variable number (integer) "j" suffixed to each of them. Each CI_SRP has CI_SA indicating the start address of cell information M_CI (S_CI in the case of still pictures).

There are M_CIs, the number of which is equal to the cell number indicated by the C_Ns. Each M_CI has M_C_GI representing general information about the related cell, and M_C_EPI representing cell entry point information. The M_C_EPI may be omitted from the M_CI.

The M_C_GI has C_TY representing the type of the related cell, and C_EPI_Ns indicating the number of cell entry points.

There are M_C_EPIs, the number of which is equal to the cell entry point number indicated by the C_EPI_Ns. The M_C_EPIs are discriminated from each other by a variable number (integer) "k" suffixed to each of them. Each M_C_EPI has EP_TY representing the type of the related entry point, EP_PTM representing the playback time position of the related entry point, and PRM_TXTI representing primary text information concerning the related entry point.

Each entry point is information for designating an arbitrary moment (time position) in the related cell and allowing an access to an arbitrary intermediate point in the related cell or program. In FIGS. 4 and 5, entry points defined in cells are denoted by the arrows EP.

In the case of the playback of a cell related to still pictures, the S_CI is used instead of the M_CI. When moving-picture data and still-picture data are recorded regarding an original PGC, they are mixed on a cell-by-cell basis. On a user defined PGC, there can be a mixture of cells related to moving-picture data and cells related to still-picture data.

First Embodiment

Figure 7:
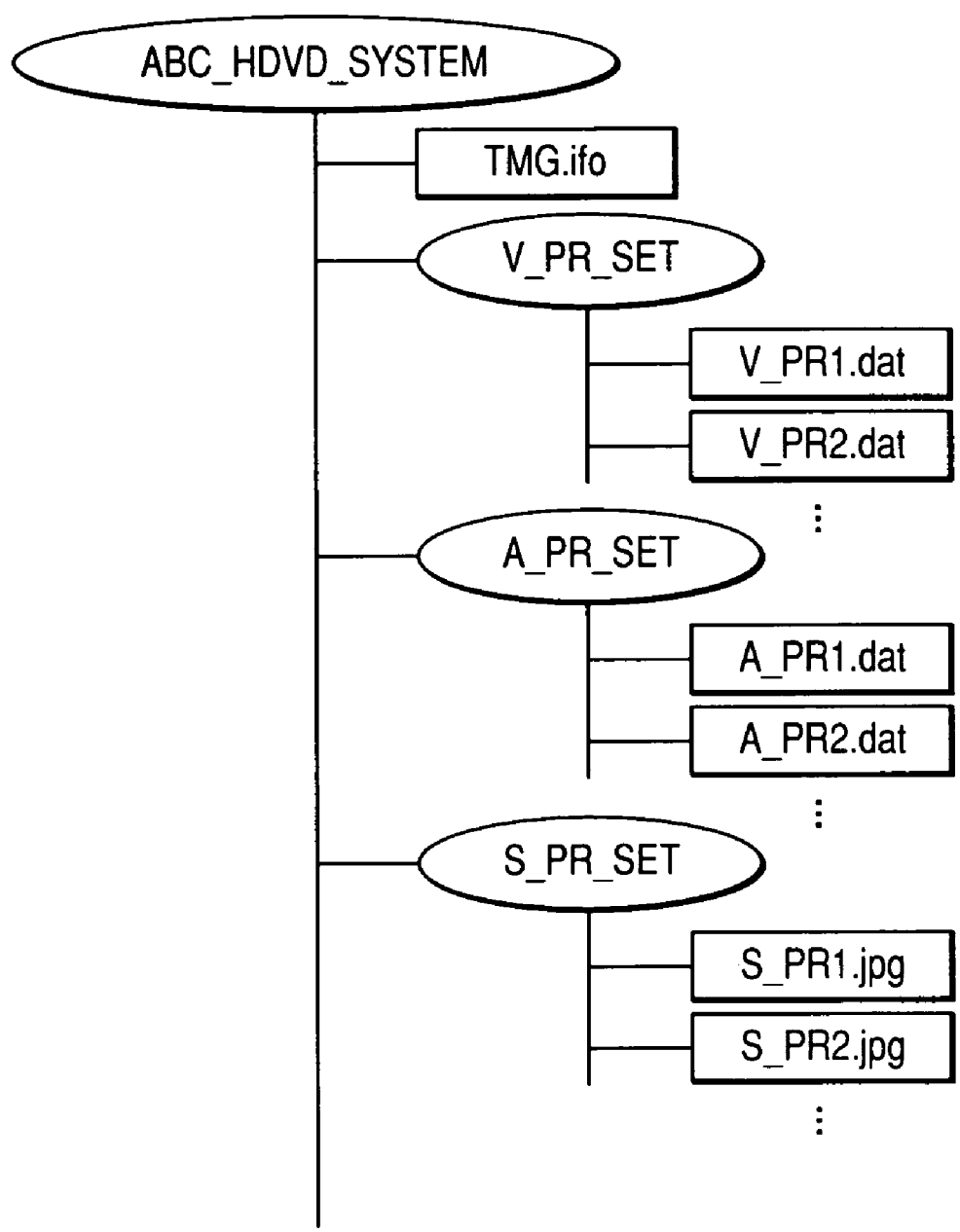
FIG. 7 is a diagram of a directory and file structure in a first embodiment of this invention.

FIG. 7 shows an example of a data structure (a directory and file structure) accorded with a disc format used in a first embodiment of this invention. The data structure in FIG. 7 may be a modification or customization of that in FIG. 3.

With reference to FIG. 7, an ABC_HDVD_SYSTEM directory exists under a root directory (not shown in FIG. 7). All management data, audio data, moving-picture data, and still-picture data are stored as files under the ABC_HDVD_SYSTEM directory. The ABC_HDVD_SYSTEM directory corresponds to the DVD_RTAV directory in FIG. 3 while the files of management data, audio data, moving-picture data, and still-picture data correspond to the VR_MANGR.IFO file, the VR_AUDIO.VRO file, the VR_MOVIE.VRO file, and the VR_STILL.VRO file in FIG. 3.

Regarding moving-picture files, a V_PR_SET directory exists under the ABC_HDVD_SYSTEM directory. The V_PR_SET directory is designed for grouping recorded VOBs. Each VOB is recorded in the V_PR_SET directory as a V_PRn.dat file ("n" denotes a program ID number starting from "1"). Each VOB has a program stream or a transport stream conforming with the MPEG-2 system standards. The V_PRn.dat files correspond to the VR_MOVIE.VRO file in FIG. 3.

Regarding audio files, an A_PR_SET directory exists under the ABC_HDVD_SYSTEM directory. The A_PR_SET directory is designed for grouping recorded audio objects (AOBs) similar to VOBs. Each AOB is recorded in the A_PR_SET directory as an A_PRn.dat file ("n" denotes a program ID number starting from "1"). Each AOB has a program stream or a transport stream conforming with the MPEG-2 system standards. The A_PRn.dat files correspond to the VR_AUDIO.VRO file in FIG. 3.

Figure 8:
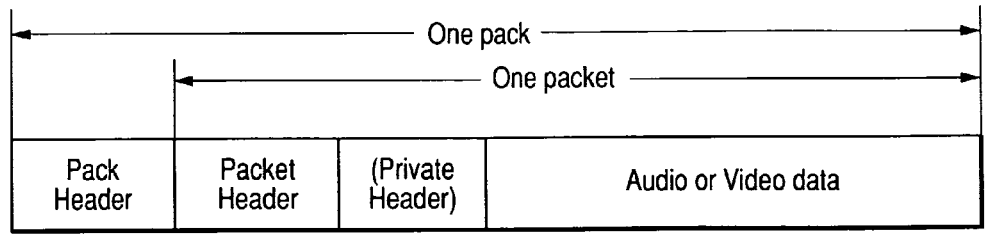
FIG. 8 is a diagram of the structure of one data pack prescribed by the MPEG standards.

Packing data is implemented for recording VOBs and AOBs. As shown in FIG. 8, one data pack prescribed by the MPEG-2 standards has a pack header and a packet following the pack header. The packet has a packet header and an audio or video data area following the packet header. A private header may be placed between the packet header and the audio or video data area. Each VOB or AOB is divided into segments each having a prescribed number of bytes. Each VOB or AOB segment is placed in the audio or video data area in a packet.

With reference back to FIG. 7, there is an S_PR_SET directory under the ABC_HDVD_SYSTEM directory regarding still-picture files. The S_PR_SET directory is designed for grouping files of recorded still pictures. Each still-picture file is recorded in the S_PR_SET directory as an S_PRn.jpg file ("n" denotes a program ID number starting from "1"). Thus, the still-picture files are JPEG files. The S_PRn.jpg files correspond to the VR_STILL.VRO file in FIG. 3.

It should be noted that groups of files relating to moving-picture, audio, and still-picture programs may be recorded under a same directory such as an AVS_PR_SET directory.

One moving-picture program is recorded as one V_PRn.dat file. Similarly, one audio program is recorded as one A_PRn.dat file. All video programs may be continuously recorded as one file, for example, a V_PR.dat file. In this case, special information representing the correspondence between the programs and the portions of the V_PR.dat file is additionally stored. Similarly, all audio programs may be continuously recorded as one file, for example, an A_PR.dat file. In this case, special information representing the correspondence between the programs and the portions of the A_PR.dat file is additionally stored. One still-picture program is recorded as one S_PRn.jpg file. One still-picture program has only one still picture.

There is a TMG.ifo file under the ABC_HDVD_SYSTEM directory. The TMG.ifo means total manager information. The TMG.ifo file is designed for storing original management data and user defined management data (also referred as play lists hereafter). The TMG.ifo file corresponds to the VR_MANGR.IFO file in FIG. 3. The original management data corresponds to the original PGC in FIG. 4. The user defined management data corresponds to the user defined PGC in FIG. 5.

Figure 9:
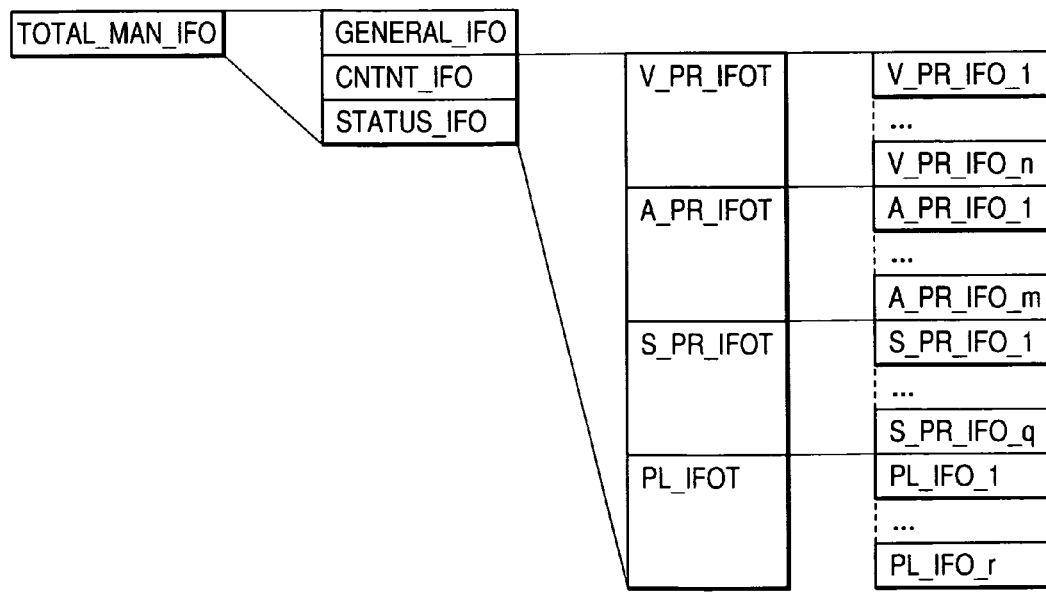
FIG. 9 is a diagram of the structure of a TMG.ifo file in the first embodiment of this invention.

FIG. 9 shows the structure of the TMG.ifo file. As shown in FIG. 9, the TMG.ifo file has TOTAL_MAN_IFO (total manager information) which consists of GENERAL_IFO (general information), CNTNT_IFO (content information), and STATUS_IFO (status information).

The STATUS_IFO represents information relating to the status such as the ID number or the type of a last-played-back program.

The CNTNT_IFO consists of a moving-picture program information structural body V_PR_IFOT (video program information table), an audio program information structural body A_PR_IFOT (audio program information table), a still-picture program information structural body S_PR_IFOT (video program information table), and a play list information structural body PL_IFOT (play list information table). Each of the moving-picture program information structural body V_PR_IFOT, the audio program information structural body A_PR_IFOT, and the still-picture program information structural body S_PR_IFOT has parts corresponding to respective programs. The play list information structural body PL_IFOT has parts corresponding to respective play lists.

The V_PR_IFOT, the A_PR_IFOT, and the S_PR_IFOT are original management data for moving pictures, audio, and still pictures, respectively. The PL_IFOT is user defined management data.

The V_PR_IFOT has a group of information pieces V_PR_IFO_i ("i" denotes an integer from "1" to "n") for respective moving-picture programs.

The A_PR_IFOT has a group of information pieces A_PR_IFOj ("j" denotes an integer from "1" to "m") for respective audio programs.

The S_PR_IFOT has a group of information pieces S_PR_IFO_k ("k" denotes an integer from "1" to "q") for respective still-picture programs. Each of the still-picture programs has only one still picture.

The PL_IFOT has a group of information pieces PL_IFO_p ("p" denotes an integer from "1" to "r") for respective play lists.

The integers "i", "j", "k", and "p" are referred to as the V_PR_IFO number, the A_PR_IFO number, the S_PR_IFO number, and the PL_IFO number, respectively.

FIG. 10 shows an example of the data field and the contents of the partial moving-picture program information structural body V_PR_IFO_i.

With reference to FIG. 10, a PR number (V_PRN) means the ID number "i" of the related moving-picture program, and is equal to the V_PR_IFO number.

A Video Group number (V_GRN) means the ID number of the moving-picture group having the related moving-picture program.

There is a V_ATR field in which various-type attribute information about moving-picture data (VOBs) referred to by the present V_PR_IFO_i is described. The various-type attribute information has "Video_compression_mode" indicating the used compression system, "TV_system" indicating the related broadcasting system such as PAL or NTSC, "Aspect_ratio" indicating an aspect ratio of frames represented by the related moving-picture data, "Horizontal_video_resolution" indicating a horizontal resolution of the related moving pictures, and "Vertical_video_resolution" indicating a vertical resolution of the related moving pictures.

The V_PR_IFO_i is designed to describe attribute information and address information necessary for the playback of the related moving-picture program, and annexed information such as text information. The V_PR_IFO_i may take an information structure different from that of FIG. 10.

FIG. 11 shows an example of the data field and the contents of the partial audio program information structural body A_PR_IFOj.

With reference to FIG. 11, a PR number (A_PRN) means the ID number "j" of the related audio program, and is equal to the A_PR_IFO number.

An Audio Group number (A_GRN) means the ID number of the audio group having the related audio program.

A Track number (TKN) means a track ID number in the present audio group.

The A_PR_IFOj is designed to describe attribute information and address information necessary for the playback of the related audio program, and annexed information such as text information. The A_PR_IFO_i may take an information structure different from that of FIG. 11.

FIG. 12 shows an example of the data field and the contents of the partial still-picture program information structural body S_PR_IFO_k relating to one still-picture program and one still picture.

With reference to FIG. 12, a PR number (S_PRN) means the ID number "k" of the related still-picture program, and is equal to the S_PR_IFO number.

A Still picture Group number (S_GRN) means the ID number of the still-picture group having the related still-picture program.

A Linked_video_program_number is set to the PR_number of a moving-picture program linked with the present still-picture program. In the absence of a linked moving-picture program, the Linked_video_program_number is set to "0".

A Linked_video_entry_time indicates a time code (a time position) of a picture, for example, a field or a frame in the linked moving-picture program which is linked with the picture in the present still-picture program.

Accordingly, the Linked_video_program_number and the Linked_video_entry_time constitute link information representing the correspondence (the link) between the present still-picture and the moving-picture field or frame linked therewith.

There is an S_ATR field in which various-type attribute information about still-picture data referred to by the present S_PR_IFO_k is described. The various-type attribute information has "Video_compression_mode" indicating the used compression system, "TV_system" indicating the related broadcasting system such as PAL or NTSC, "Aspect_ratio" indicating an aspect ratio of the frame represented by the related still-picture data, "supplement_info" representing whether a moving picture to be used to generate original still-picture data from recorded supplementary still-picture data correspond to (1) odd-filed picture data, (2) even-field picture data, or (3) oversample picture data, "Horizontal_video_resolution" indicating a horizontal resolution of the related still picture, and "Vertical_video_resolution" indicating a vertical resolution of the related still picture.

The S_PR_IFO_k is designed to describe attribute information and address information necessary for the playback of the related still-picture program, and annexed information such as text information. The S_PR_IFO_i may take an information structure different from that of FIG. 12.

FIG. 13 shows an example of the data field and the contents of the partial play list information structural body PL_IFO_p.

With reference to FIG. 13, a PL number means the ID number "p" of the related play list.

A num_of_ud_programs indicates the number of user defined programs contained in the present play list. A user defined program UD_PR is set by the user, and one or more moving-picture programs, one or more audio programs, or one or more still-picture programs are described therein. One or more audio programs and one or more still-picture programs which should be simultaneously played back may be described therein.

A UD_PR_mode represents which of a moving-picture program or programs, an audio program or programs, and a still-picture program or programs are described in the corresponding UD_PR.

The PL_IFO_p is designed to describe attribute information and address information necessary for playing back the moving-picture program or programs, the audio program or programs, and the sill-picture program or programs while relating them with each other, and also annexed information such as text information. The PL_IFO_p may take an information structure different from that of FIG. 13.

The GENERAL_IFO in FIG. 9 has general information about the TOTAL_MAN_IFO which represents a System ID, a Version number, and the start addresses of the CNTNT_IFO and the STATUS_IFO. An example of the contents of the GENERAL_IFO is shown in FIG. 14.

Figure 15:
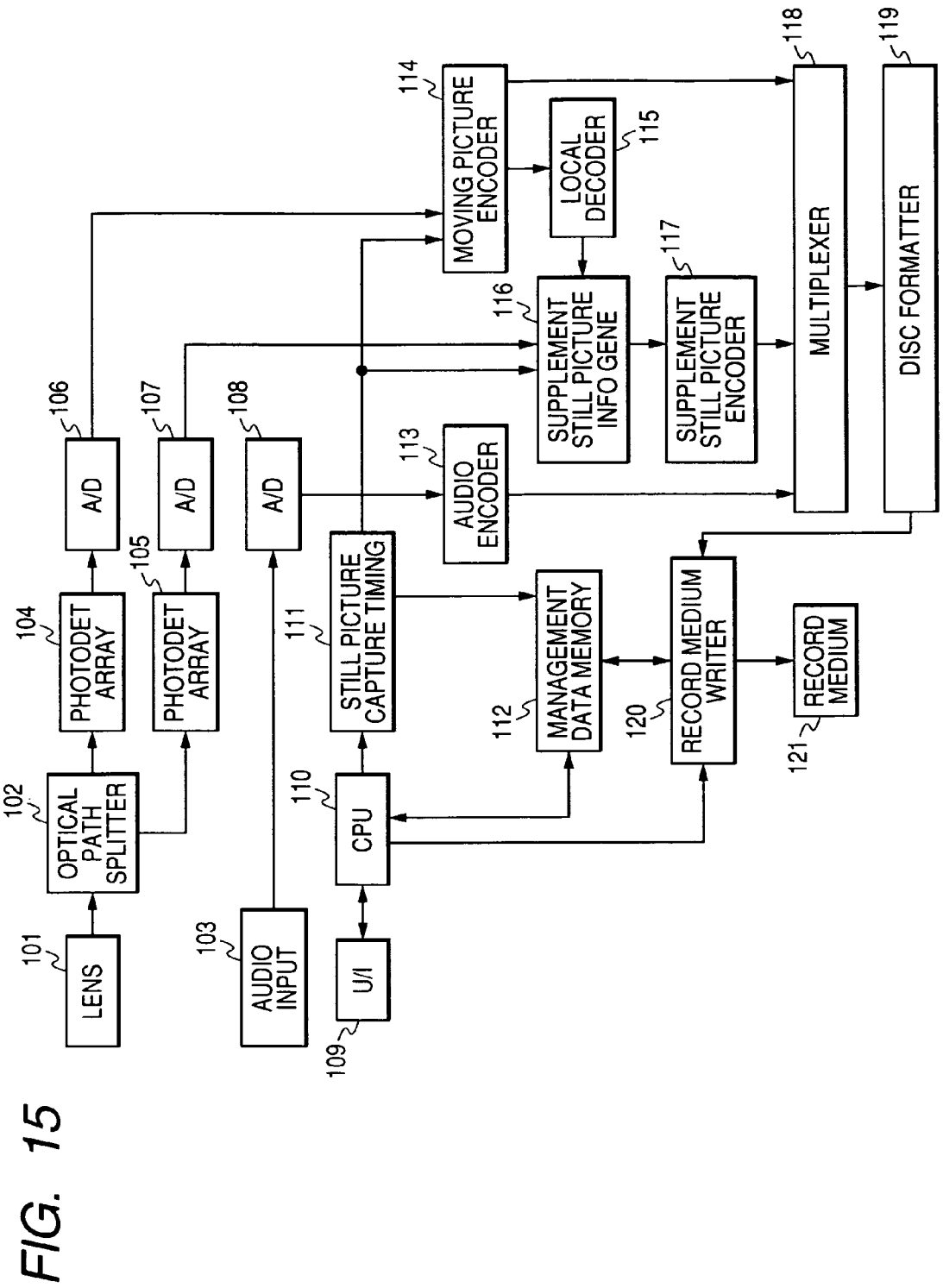
FIG. 15 is a block diagram of an information recording apparatus in the first embodiment of this invention.

FIG. 15 shows an information recording apparatus in the first embodiment of this invention. The apparatus of FIG. 15 uses the disc-format data structure of FIGS. 7-14. The apparatus of FIG. 15 is designed so that even during the recording of moving-picture data, still-picture data having a reduced information amount can also be recorded without interrupting the recording of moving-picture data.

The apparatus of FIG. 15 includes a lens 101. Incident light passes through the lens 101 before reaching an optical-path splitter 102. The optical-path splitter 102 includes a prism or a semitransparent mirror. The optical-path splitter 102 separates the incident light into first and second portions. The first portion of the incident light is applied to a photodetector element array or an image sensor 104 for capturing moving pictures. The second portion of the incident light is applied to a photodetector element array or an image sensor 105 for capturing still pictures. Each of the photodetector element arrays 104 and 105 includes, for example, a CCD device or a CMOS device.

Preferably, the horizontal-direction and vertical-direction resolutions of the still-picture photodetector element array 105 are greater than those of the moving-picture photodetector element array 104. For example, the resolution of the still-picture photodetector element array 105 in the vertical direction is equal to twice that of the moving-picture photodetector element array 104.

Figure 16:
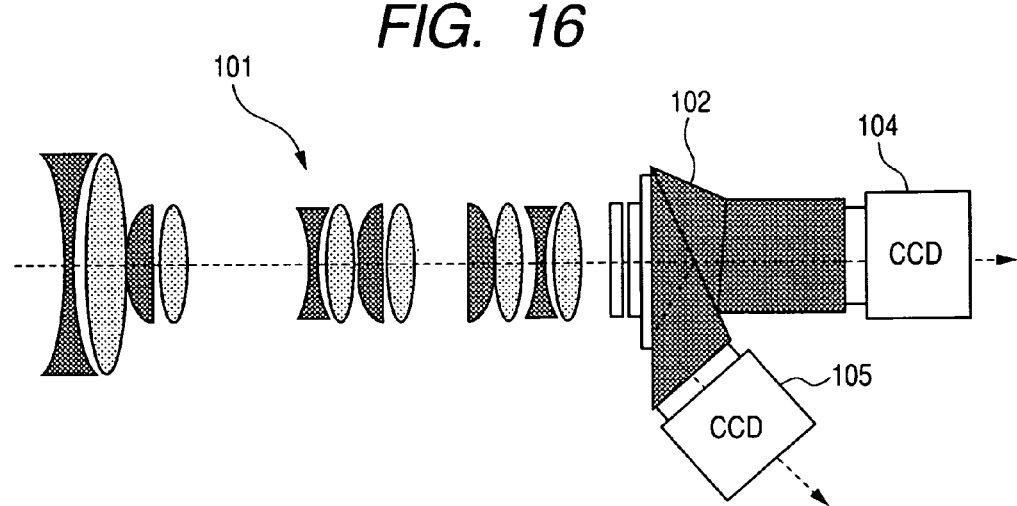
FIG. 16 is a sectional diagram of an optical block including a lens, an optical-path splitter, and photodetector element arrays in FIG. 15.

The lens 101, the optical-path splitter 102, and the photodetector element arrays 104 and 105 are contained in an optical block. FIG. 16 shows an example of the optical block. With reference to FIG. 16, the lens 101 includes a group of sub lenses successively arranged along the incident-light path. The optical-path splitter 102 includes a prism following the lens 101. The optical-path splitter 102 has first and second output portions facing the photodetector element arrays 104 and 105 respectively. Each of the photodetector element arrays 104 and 105 includes a CCD device.

With reference back to FIG. 15, the photodetector element array 104 converts the applied light into an electric analog picture signal through photoelectric conversion. The photodetector element array 104 outputs the analog picture signal to an A/D converter 106. The A/D converter 106 changes the analog picture signal into a corresponding digital picture signal. The A/D converter 106 outputs the digital picture signal to a moving-picture encoder 114. The device 114 encodes the digital picture signal according to the MPEG standards to get encoded moving-picture data. The moving-picture encoder 114 outputs the encoded moving-picture data to a multiplexer 118.

The photodetector element array 105 converts the applied light into an electric analog picture signal through photoelectric conversion. The photodetector element array 105 outputs the analog picture signal to an A/D converter 107. The A/D converter 107 changes the analog picture signal into a corresponding digital picture signal. The A/D converter 107 outputs the digital picture signal to a supplementary still-picture information generator 116.

An audio input device 103 outputs an analog audio signal to an A/D converter 108. The audio input device 103 includes, for example, a microphone. The A/D converter 108 changes the analog audio signal into a corresponding digital audio signal. The A/D converter 108 outputs the digital audio signal to an audio encoder 113. The audio encoder 113 subjects the digital audio signal to an encoding process inclusive of signal compression accorded with "Dolby AC3". Thereby, the audio encoder 113 converts the digital audio signal into encoded audio data. The audio encoder 113 outputs the encoded audio data to the multiplexer 118.

An user interface (U/I) 109 is a device for inputting information of operation by a user. For example, in the case where operation information representing that a shutter button (a still-picture recording button) in the user interface 109 is depressed by the user is inputted during the recording of moving-picture data, the user interface 109 outputs a signal representative of the timing of the depression of the shutter button to a CPU 110.

Upon the reception of the shutter-button depression timing signal, the CPU 110 sends a still-picture capture timing signal generator 111 a command to start the recording of still-picture data.

Upon the reception of the still-picture recording start command, the still-picture capture timing signal generator 111 sends a still-picture recording start signal to the moving-picture encoder 114 and the supplementary still-picture information generator 116. At the same time, the still-picture capture timing signal generator 111 produces a signal representing a program ID number of a still picture to be recorded, and signals representing a picture time code (a picture time position) and a program ID number of a moving picture, for example, a moving picture field or frame linked with the still picture. The still-picture capture timing signal generator 111 sends these produced signals to a management data memory 112. Furthermore, the still-picture capture timing signal generator 111 sends the produced signal representative of the still-picture program ID number to the moving-picture encoder 114.

The moving-picture encoder 114 is designed to implement an MPEG encoding process to get encoded data forming an MPEG stream. Upon the reception of the still-picture recording start signal, the moving-picture encoder 114 starts encoding the current portion of the moving-picture data, that is, the digital picture signal outputted from the A/D converter 106. At the same time, the moving-picture encoder 114 sets and places the received signal representative of the still-picture program ID number in an MPEG user data area added for the current picture represented by the encoded moving-picture data. Thereby, a still picture captured during the recording of moving pictures, and one of the moving pictures which is captured at a timing equal or similar to the timing of the capture of the still picture are made into a correspondence relation (a link). By referring to this correspondence relation, the linked still picture can be found from the moving-picture side. The moving-picture encoder 114 outputs the encoded moving-picture data to the multiplexer 118.

The still-picture program ID number means the PR_number (S_PRN) in the S_PR_IFO field of the partial still-picture program information structural body in FIG. 12.

Figure 17:
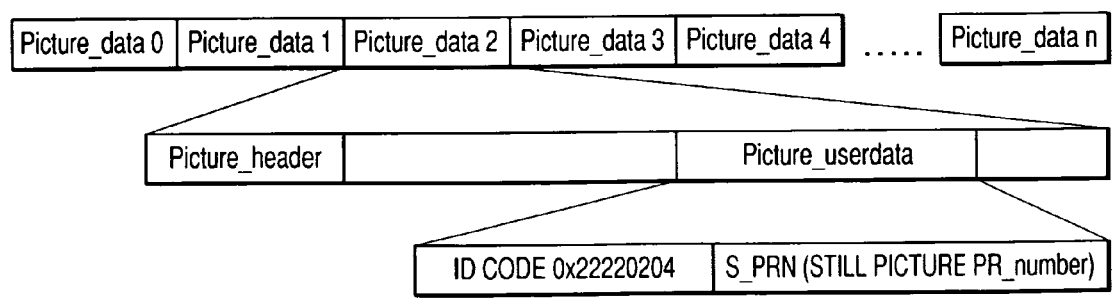
FIG. 17 is a diagram of the structure of an MPEG stream.

With reference to FIG. 17, an MPEG stream is divided into time portions representing respective pictures and denoted as "Picture_data 0", "Picture_data 1", "Picture_data 2", . . . , and "Picture_data n". Each picture-representing time portion has a user data area "Picture_userdata" that means the MPEG user data area for storing the signal representative of the still-picture program ID number (the PR_number).

FIG. 18 shows the syntax of one picture in the MPEG-2 video layer. In FIG. 18, there is "user_data" that is used as the MPEG user data area. The "user_data" starts from a uniquely-decidable byte-aligned start code "User_data_start_code" and continues until the occurrence of 3 bytes each of "0x000001". The still-picture ID information (S_PRN) is described in the "user_data". There is a possibility that another application may use the "user_data". Accordingly, an ID code of "0x22220204" representing that the still-picture ID information (S_PRN) in the present embodiment of this invention will follow is described in 4 bytes in the "user_data" which are subsequent to the start code "User_data_start_code". Thereby, it is possible to prevent the still-picture ID information (S_PRN) from being confused with user data to be employed by the other application.

It should be noted that the length of the above-indicated ID code may differ from 4 bytes. Furthermore, the ID code may be of a logic state other than "0x22220204".

With reference back to FIG. 15, a moving-picture local decoder 115 receives the encoded data from the moving-picture encoder 114. The moving-picture local decoder 115 locally decodes the encoded data to get decoded data. The moving-picture local decoder 115 sends the decoded data to the supplementary still-picture information generator 116.

The supplementary still-picture information generator 116 removes, from the still-picture data (that is, the digital picture signal outputted by the A/D converter 107), components closely correlating with and strongly resembling moving-picture data equal or similar in capture timing to the still-picture data to get supplementary still-picture information (supplementary still-picture data). The supplementary still-picture information generator 116 may utilize the decoded data from the moving-picture local decoder 115 in getting the supplementary still-picture information. In this case, the utilized decoded data is equal or similar in capture timing to the still-picture data. In other words, the utilized decoded data corresponds to the still-picture data. The supplementary still-picture information generator 116 outputs the supplementary still-picture information to a supplementary still-picture encoder 117.

The supplementary still-picture encoder 117 compressively encodes the supplementary still-picture information on, for example, a JPEG basis to get encoded supplementary still-picture information (data). The supplementary still-picture encoder 117 outputs the encoded supplementary still-picture information (data) to the multiplexer 118.

The management data memory 112 prepares and manages the previously-mentioned TMG.ifo file while being controlled by the CPU 110. The management data memory 112 stores the TMG.ifo file. The management data memory 112 repetitively updates the TMG.ifo file stored therein in accordance with the progress of recording. As previously mentioned, the signal representing the program ID number of the still picture to be recorded, and the signals representing the picture time code and the program ID number of the moving picture linked with the still picture are sent to the management data memory 112 from the still-picture capture timing signal generator 111. These signals are processed by use of the management data memory 112 in accordance with commands from the CPU 110.

The CPU 110 decides whether a partial still-picture program information structural body having a program ID number equal to the still-picture program ID number sent to the management data memory 112 is present in or absent from the TMG.ifo file in the management data memory 112. When it is decided that such a partial still-picture program information structural body is absent from the TMG.ifo file, the CPU 110 newly generates the partial still-picture program information structural body and controls the management data memory 112 to add the newly-generated partial still-picture program information structural body to the stored TMG.ifo file. Then, the CPU 110 controls the management data memory 112 to set or place the program ID number of the newly-generated partial still-picture program information structural body in the PR_number field thereof.

The CPU 110 controls the management data memory 112 so that the program ID number of the moving picture linked with the still picture will be set or placed in the Linked_video_program_number field of the newly-generated partial still-picture program information structural body. The moving-picture program ID number is the same as the PR_number in the V_PR_IFO field of the partial moving-picture program information structural body of FIG. 10 which is generated for the moving-picture program having the linked moving picture. Thus, the PR_number of the partial moving-picture program information structural body for the linked moving picture is described in the Linked_video_program_number field of the partial still-picture program information structural body for the still picture. Thereby, a link between the moving-picture program and the still picture is provided and established as detectable one. This link is in the direction from the still-picture side to the moving-picture side.

The CPU 110 controls the management data memory 112 to set or place the picture time code of the linked moving picture in the Linked_video_entry_time field of the newly-generated partial still-picture program information structural body. The picture time code allows the identification of the related picture in the moving-picture program. For example, the picture time code uses a time code which is described in the header of every GOP defined by the MPEG standards, and which indicates hour, minute, second, and a frame number. Setting or placing the picture time code of the linked moving picture in the Linked_video_entry_time field of the newly-generated partial still-picture program information structural body provides a detectable link between the picture in the moving-picture program and the still picture. It should be noted that other information which allows the identification of a picture in the moving-picture program may be described in the Linked_video_entry_time field instead of the time code. For example, the other information indicates the number of frames from the head of the moving-picture program or the address (the number of bytes) from the head of the moving-picture program.

The multiplexer 118 receives the encoded audio data, the encoded moving-picture data, and the encoded supplementary still-picture data from the audio encoder 113, the moving-picture encoder 114, and the supplementary still-picture encoder 117 respectively. The device 118 multiplexes the encoded audio data, the encoded moving-picture data, and the encoded supplementary still-picture data on a time sharing basis to get multiplexed data. The multiplexer 118 outputs the multiplexed data to a disc formatter 119.

The device 119 formats the multiplexed data so that the encoded moving-picture data, the encoded supplementary still-picture data, and the encoded audio data therein will be assigned to and loaded into a moving-picture V_PRn.dat file in the moving-picture directory V_PR_SET, a still-picture S_PRnjpg file in the still-picture directory S_PR_SET, and an audio A_PRn.dat file in the audio directory A_PR_SET (see FIG. 7) respectively.

A recording medium writer 120 receives the TMG.ifo file from the management data memory 112 while being controlled by the CPU 110. The recording medium writer 120 receives the moving-picture V_PRn.dat file, the still-picture S_PRn.jpg file, and the audio A_PRn.dat file from the disc formatter 119. The device 120 records the TMG.ifo file, the moving-picture V_PRn.dat file, the still-picture S_PRnjpg file, and the audio A_PRn.dat file on a recording medium 121 in accordance with a control signal outputted from the CPU 110. Preferably, the recording of the moving-picture V_PRn-.dat file, the still-picture S_PRn.jpg file, and the audio A_PRn.dat file precedes the recording of the TMG.ifo file.

A buffer is provided in the disc formatter 119 or the recording medium writer 120. The buffer implements the buffering of the formatted data generated by the disc formatter 119.

Figure 19:
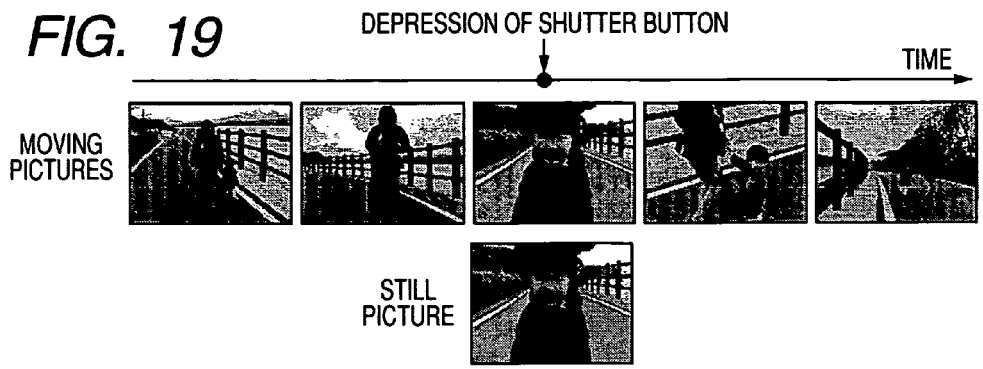
FIG. 19 is a diagram of moving pictures and a still picture.

FIG. 19 shows first, second, third, fourth, and fifth pictures in a moving-picture stream captured by the apparatus of FIG. 15. In FIG. 19, the shutter button is depressed at substantially the same timing as the third picture. In this case, a still picture corresponding to the third picture is captured by the apparatus of FIG. 15.

Operation of a first example of the supplementary still-picture information generator 116, the moving-picture data, and the still-picture data will be described hereafter.

Figure 20:
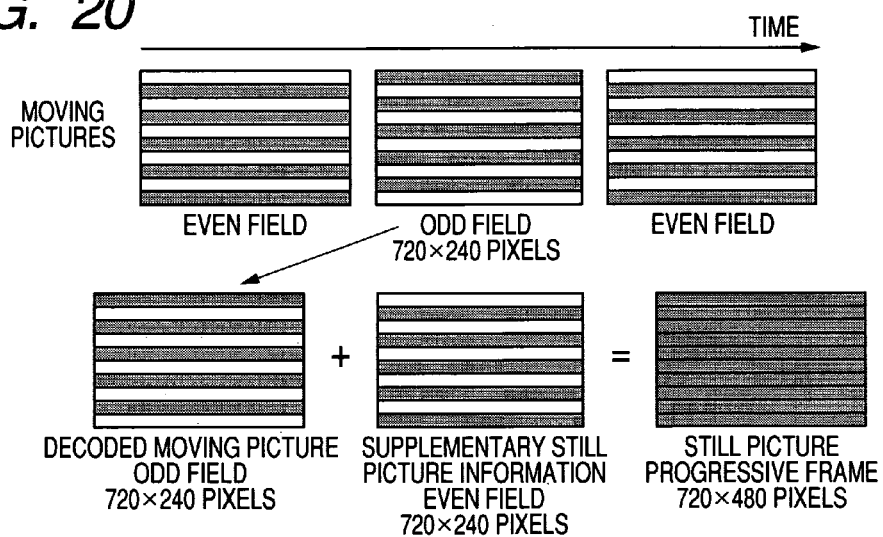
FIG. 20 is a diagram of fields represented by moving-picture data of an interlaced scan type, a field represented by supplementary still-picture information, and a frame represented by still-picture data of a progressive scan type.

With reference to FIG. 20, the moving-picture data is of the interlaced scan type while the still-picture data is of the progressive scan type. The moving-picture data represents a stream of frames each composed of an odd filed and an even field (a top field and a bottom field) mating with each other. Each of the odd field and the even field has a size of 720 by 240 pixels. A still picture captured at substantially the same timing as that of a moving-picture field is a progressive frame having a size of 720 by 480 pixels. Thus, the sizes of the captured still picture and a captured moving picture are equal on a frame basis.

A succession of an even field, an odd field, and an even field represented by the moving-picture data is shown in an upper half of FIG. 20. During the recording of the moving-picture data, a still picture is captured. Data representing the captured still picture and data representing a moving-picture field occurring at substantially the same timing as the still-picture capture timing closely correlate with each other. The above-indicated moving-picture field is of the odd type and has a size of 720 by 240 pixels in FIG. 20. On the other hand, the captured still picture is a progressive frame having a size of 720 by 480 pixels. Due to the above-mentioned close correlation, odd-field-corresponding components of the data representing the captured still picture are almost the same as the data representing the moving-picture odd field. Accordingly, the supplementary still-picture information generator 116 removes, from the captured still-picture data, components corresponding to the data representing the moving-picture odd field to get supplementary still-picture information (supplementary still-picture data) corresponding to the even field having a size of 720 by 240 pixels. In this case, the supplementary still-picture information generator 116 does not utilize the decoded data from the moving-picture local decoder 115 in getting the supplementary still-picture information.

During the playback, the data representing the moving-picture odd field and the supplementary still-picture information corresponding to the even field are added so that the data representing the original captured still picture as the progressive frame having a size of 720 by 480 pixels will be reproduced.

Operation of a second example of the supplementary still-picture information generator 116, the moving-picture data, and the still-picture data will be described hereafter.

Figure 21:
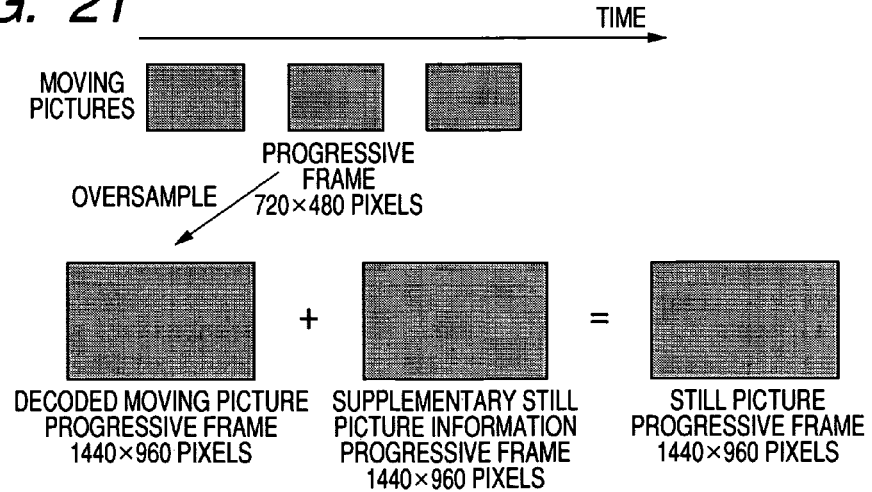
FIG. 21 is a diagram of frames represented by moving-picture data of the progressive scan type, supplementary still-picture information, and still-picture data of the progressive scan type.

With reference to FIG. 21, both the moving-picture data and the still-picture data are of the progressive scan type. The moving-picture data represents a stream of progressive frames each having a size of 720 by 480 pixels. A still picture captured at substantially the same timing as that of a moving-picture frame is a progressive frame having a size of 1440 by 960 pixels. Thus, the captured still picture is greater in pixel-number-based frame size than a captured moving picture.

A succession of first, second, and third frames represented by the moving-picture data of the progressive type is shown in an upper half of FIG. 21. During the recording of the moving-picture data, a still picture is captured. There is a close correlation between data representing the captured still picture and data representing a moving-picture frame occurring at substantially the same timing as the still-picture capture timing. In FIG. 21, the above-indicated moving-picture frame is the second one among the three progressive frames, and has a size of 720 by 480 pixels. On the other hand, the captured still picture is a progressive frame having a size of 1440 by 960 pixels. Thus, the resolution of the captured still picture is equal to four times the resolution of the moving-picture frame. Due to the above-mentioned close correlation, the contents of the data representing the captured still picture are almost the same as that of the data representing the moving-picture frame. Furthermore, the captured-still-picture data and the moving-picture data are basically similar to each other. Specifically, the captured-still-picture data and the moving-picture data differ from each other only in high spatial frequency components. The captured-still-picture data and the moving-picture data are substantially the same in intermediate and low spatial frequency components. Accordingly, the supplementary still-picture information generator 116 oversamples the decoded data from the moving-picture local decoder 115 to equalize the related frame size to the still-picture frame size and uses the resultant decoded data (the oversampled data) as redundant intermediate and low spatial frequency picture data, and then subtracts the redundant intermediate and low spatial frequency picture data from the captured still-picture data to get supplementary still-picture information (supplementary still-picture data).

During the playback, data representing a moving-picture frame of 1440 by 960 pixels is generated from the data representing the 720-by-480-pixel moving-picture frame corresponding to the captured still picture through oversampling. The data representing the 1440-by-960-pixel moving-picture frame and the supplementary still-picture information are added so that the data representing the original captured still picture as a progressive frame having a size of 1440 by 960 pixels will be reproduced.

The CPU 110 can control the devices 103-109, and 111-120. The CPU 110 operates in accordance with a control program (a computer program) stored in its internal memory. The control program may be read out from a recording medium before being stored into the memory within the CPU 110. Alternatively, the control program may be downloaded into the memory within the CPU 110 via a communication network.

Figure 22:
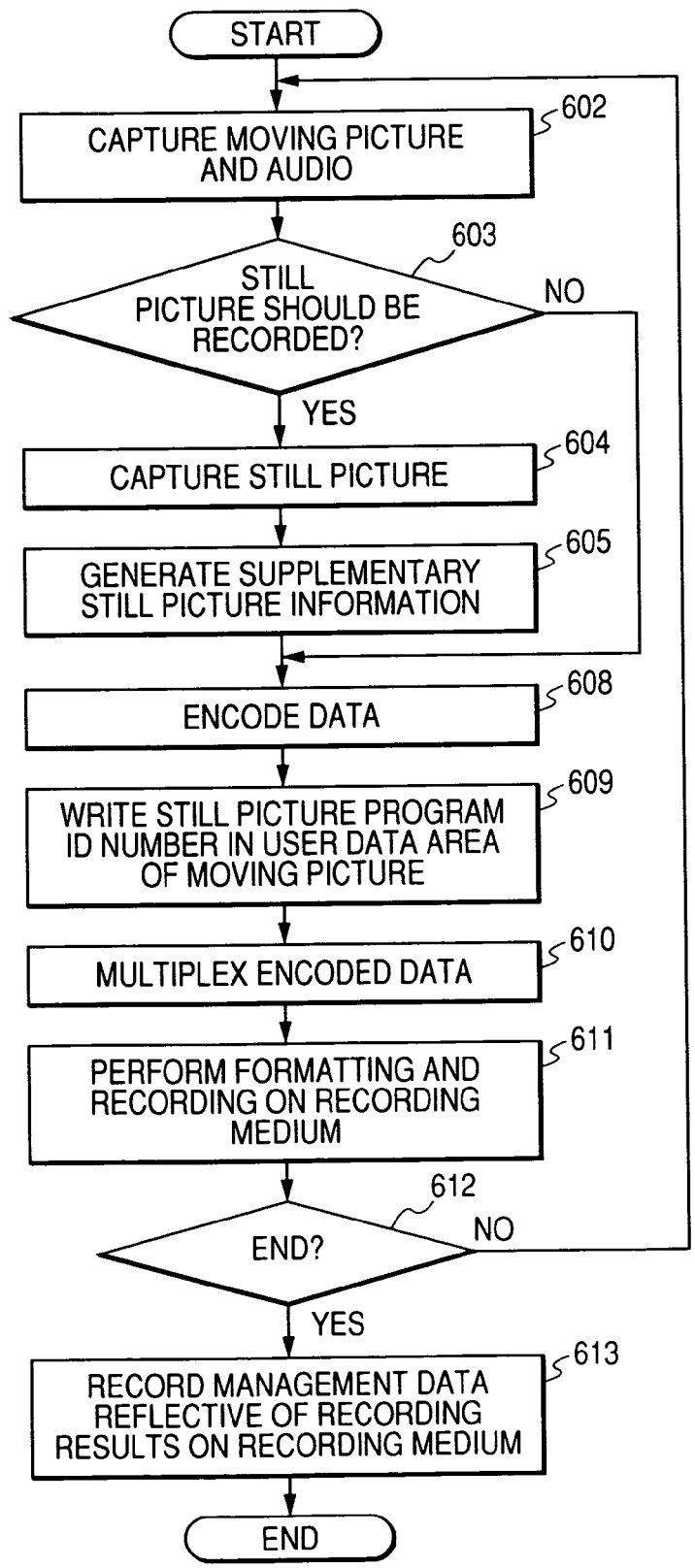
FIG. 22 is a flowchart of a control program for a CPU in FIG. 15.

FIG. 22 is a flowchart of the computer program. As shown in FIG. 22, a first step 602 of the computer program controls the photodetector element array 104 and the A/D converter 106 to capture moving pictures and generate corresponding moving-picture data. In addition, the step 602 controls the audio input device 103 and the A/D converter 108 to generate audio data.

A step 603 following the step 602 decides whether or not a still picture should be recorded by referring to information from the user interface 109. The information from the user interface 109 represents, for example, the depression of the shutter button (the still-picture recording button). When it is decided that a still picture should be recorded, the computer program advances from the step 603 to a step 604. Otherwise, the computer program jumps from the step 603 to a step 608.

The step 604 controls the photodetector element array 105 and the A/D converter 107 to capture a still picture and generate corresponding still-picture data. The step 604 controls the still-picture capture timing signal generator 111 to generate link information representing a picture time code (a picture time position) and a program ID number of a moving picture, for example, a moving picture field or frame linked with the captured still picture. The generated link information will be used in the updating of the TMG.ifo file in the management data memory 112.

A step 605 subsequent to the step 604 controls the supplementary still-picture information generator 116 to generate supplementary still-picture data from the still-picture data. After the step 605, the computer program advances to the step 608.

The step 608 controls the moving-picture encoder 114 to encode the moving-picture data through an MPEG-2 compressively encoding procedure to get encoded moving-picture data. In addition, the step 608 controls the audio encoder 113 to encode the audio data through a Dobly-AC3 encoding procedure or an MPEG audio encoding procedure to get encoded audio data. Furthermore, the step 608 controls the supplementary still-picture encoder 117 to encode the supplementary still-picture data through a JPEG compressively encoding procedure to get encoded supplementary still-picture data (information).

A step 609 following the step 608 controls the still-picture capture timing signal generator 111 and the moving-picture encoder 114 to set and place the signal representative of the program ID number of the captured still picture in a user data area provided in the encoded moving-picture data for a moving picture linked with the captured still picture. The still-picture program ID number is equal to the PR_number (S_PRN) in the S_PR_IFO field of the partial still-picture program information structural body in FIG. 12.

A step 610 subsequent to the step 609 controls the multiplexer 118 to multiplex the encoded moving-picture data, the encoded audio data, and the encoded supplementary still-picture data to get multiplexed data. During the multiplexing, the encoded moving-picture data, the encoded audio data, and the encoded supplementary still-picture data are processed into packs, and pack headers and time stamps are added thereto.

A step 611 following the step 610 controls the disc formatter 119 to format the multiplexed data into the data structure of FIGS. 7-14 to get the formatted data. In addition, the step 611 controls the disc formatter 119 and the recording medium writer 120 to subject the formatted data to buffering by use of the buffer in the device 119 or 120, and to record the buffering-resultant data on the recording medium 121. Each time a certain amount of the formatted data is stored in the buffer, the formatted data is sent therefrom and is recorded on the recording medium 121. The step 611 controls the management data memory 112 to update the TMG.ifo file therein in accordance with the present recoding. For the recorded still picture, the step 611 functions to generate a partial still-picture program information structural body in the TMG.ifo file, and to write the link information therein. Specifically, the step 611 functions to place the program ID number of the linked moving picture in the Linked_video_program_number field of the partial still-picture program information structural body, and to place the picture time code of the linked moving picture in the Linked_video_entry_time field of the partial still-picture program information structural body.

A step 612 following the step 611 decides whether or not the recording of moving-picture data should be terminated by referring to, for example, information from the user interface 109. When it is decided that the recording should be terminated, the computer program advances from the step 612 to a step 613. Otherwise, the computer program returns from the step 612 to the step 602.

The step 613 controls the management data memory 112 and the recording medium writer 120 to record the TMG.ifo file on the recording medium 121. The TMG.ifo file contains the management data. Specifically, the TMG.ifo file includes the Linked_video_program_number information and the Linked_video_entry_time information for each captured and recorded still picture. After the step 613, the current execution cycle of the computer program ends.

Second Embodiment

Figure 23:
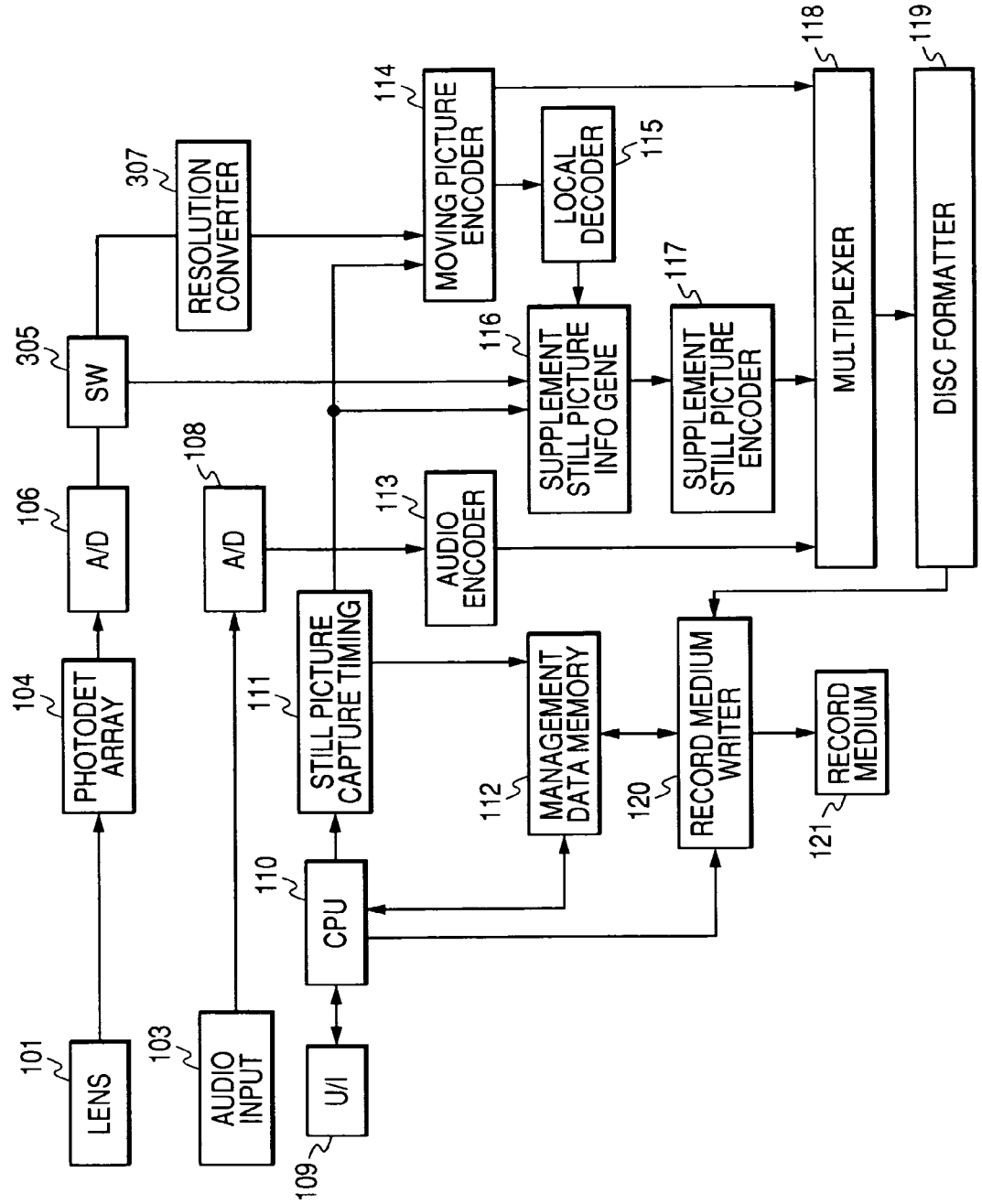
FIG. 23 is a block diagram of an information recording apparatus according to a second embodiment of this invention.

FIG. 23 shows an information recording apparatus according to a second embodiment of this invention. The apparatus of FIG. 23 is similar to the apparatus of FIG. 15 except for design changes described hereafter. The apparatus of FIG. 23 additionally includes a switch 305 and a resolution converter 307. The optical-path splitter 102, the photodetector element array 105, and the A/D converter 107 (see FIG. 15) are omitted from the apparatus of FIG. 23.

In the apparatus of FIG. 23, the lens 101 is directly followed by the photodetector element array 104. The photodetector element array 104 has a relatively high resolution.

Operation of the apparatus of FIG. 23 can be changed between a still-picture recording mode and a moving-picture recording mode.

During the moving-picture recording mode of operation, the switch 305 is controlled by the CPU 110 to direct the digital picture signal from the A/D converter 106 to the resolution converter 307. The resolution converter 307 processes the digital picture signal to reduce the resolution of every picture represented by the digital picture signal. Thereby, the resolution converter 307 obtains the resolution-reduced digital picture signal. The resolution converter 307 outputs the resolution-reduced digital picture signal to the moving-picture encoder 114. The device 114 encodes the resolution-reduced digital picture signal.

During the still-picture recording mode of operation, the switch 305 is controlled by the CPU 110 to direct the digital picture signal from the A/D converter 106 to the supplementary still-picture information generator 116. The supplementary still-picture information generator 116 produces supplementary still-picture information (supplementary still-picture data) from the digital picture signal.

Third Embodiment

Figure 24:
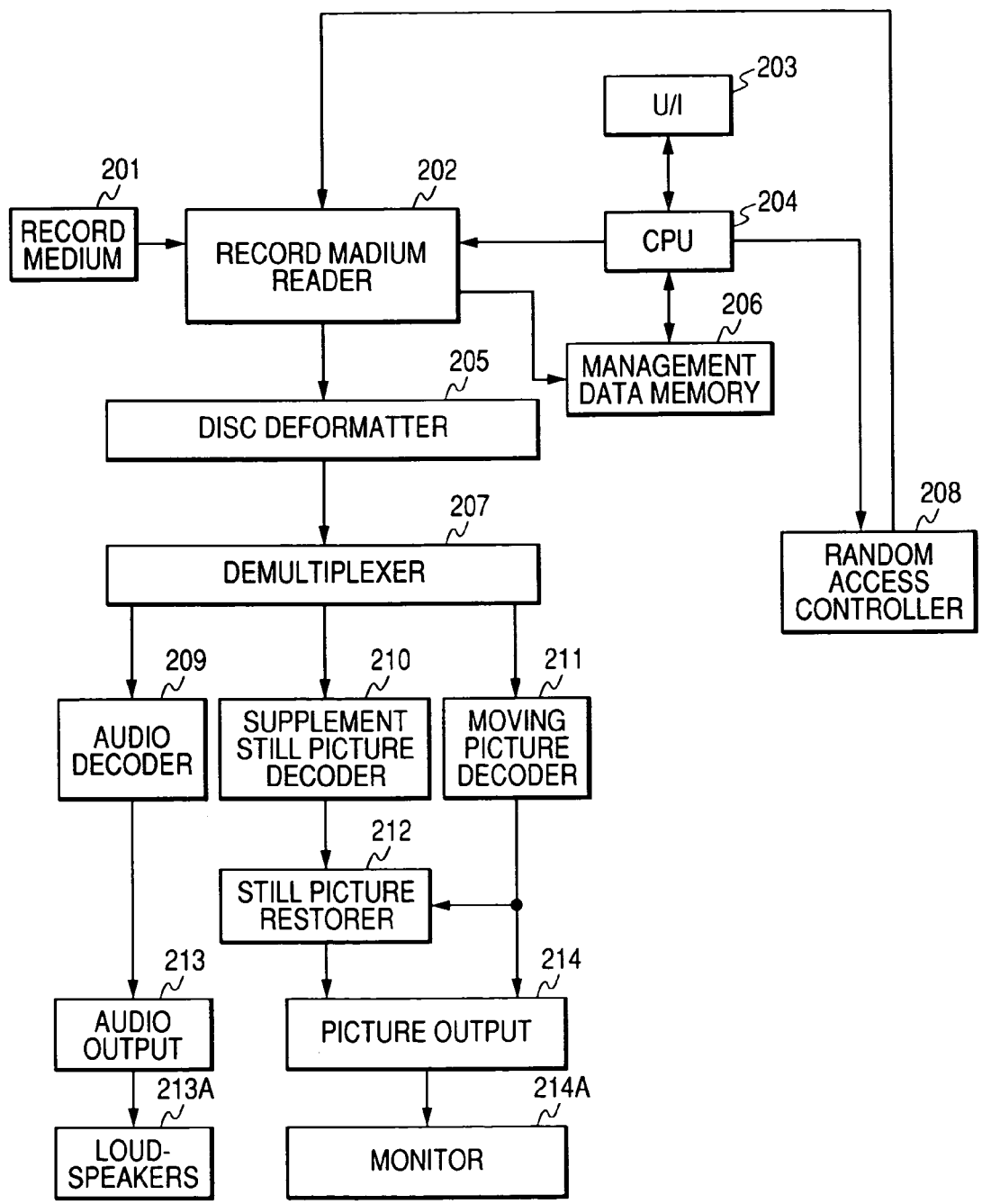
FIG. 24 is a block diagram of an information reproducing apparatus according to a third embodiment of this invention.

FIG. 24 shows an information reproducing apparatus according to a third embodiment of this invention. The apparatus of FIG. 24 reproduces data representing moving pictures, and also data representing at least one still picture and having a reduced information amount. The apparatus of FIG. 24 displays the moving pictures. In addition, the apparatus of FIG. 24 generates data representing at least one original still picture from the information-amount-reduced still-picture data, and displays the original still picture.

The apparatus of FIG. 24 reproduces information from a recording medium 201. Basically, the information has been recorded on the recording medium 201 by the apparatus of FIG. 15 or FIG. 23.

The apparatus of FIG. 24 includes a user interface (U/I) 203 which sends a CPU 204 a user's command to playback moving pictures or at least one still picture. Upon the reception of the moving-picture playback command or the still-picture playback command from the user interface 203, the CPU 204 feeds a recording medium reader 202 with a command to start the playback of moving pictures or at least one still picture.

Upon the reception of the playback start command from the CPU 204, the recording medium reader 202 reads out a moving-picture V_PRn.dat file, a still-picture S_PRn.jpg file, an audio A_PRn.dat file, and a TMG.ifo file from the recording medium 201. The recording medium reader 202 stores the read-out TMG.ifo file into a management data memory 206. The recording medium reader 202 feeds the read-out moving-picture V_PRn.dat file, still-picture S_PRn.jpg file, and audio A_PRn.dat file to a disc deformatter 205.

The device 205 deformats the moving-picture V_PRn.dat file, the still-picture S_PRn.jpg file, and the audio A_PRn.dat file into multiplexed data. The disc deformatter 205 outputs the multiplexed data to a demultiplexer 207.

The demultiplexer 207 separates the multiplexed data into encoded moving-picture data, encoded supplementary still-picture data, and encoded audio data. The demultiplexer 207 feeds the encoded audio data, the encoded supplementary still-picture data, and the encoded moving-picture data to an audio decoder 209, a supplementary still-picture decoder 210, and a moving-picture decoder 211 respectively.

The device 209 decodes the encoded audio data to get decoded audio data. The audio decoder 209 feeds the decoded audio data to an audio output device 213. The device 210 decodes the encoded supplementary still-picture data to get decoded supplementary still-picture data (information). The supplementary still-picture decoder 210 feeds the decoded supplementary still-picture data (information) to a still-picture restorer 212. The device 211 decodes the encoded moving-picture data to get decoded moving-picture data. The moving-picture decoder 211 feeds the decoded moving-picture data to the still-picture restorer 212 and a picture output device 214.

The still-picture restorer 212 reproduces data representative of an original captured still picture from the supplementary still-picture data (information) and a portion of the moving-picture data which is equal or similar in capture timing to the supplementary still-picture data. The still-picture restorer 212 feeds the reproduced original still-picture data to the picture output device 214.

The restoration of the original still picture utilizes link information for identifying the portion of the moving-picture data which is equal or similar in capture timing to the supplementary still-picture data. The link information is described in the TMG.ifo file stored in the management data memory 206. Basically, the link information is transmitted from the management data memory 206 to the recording medium reader 202, and the recording medium reader 202 accesses the recording medium 201 in response to the link information to read out the portion of the recorded moving-picture data therefrom which is equal or similar in capture timing to the supplementary still-picture data. The read-out portion of the moving-picture data is transmitted from the recording medium reader 202 to the still-picture restorer 212 through the disc formatter 205, the demultiplexer 207, and the moving-picture decoder 211 while being decoded by the moving-picture decoder 211.

A random access controller 208 is controlled by the CPU 204. During the playback of moving pictures, the device 208 can control the recording medium reader 202 to search a moving-picture stream for a desired picture. Furthermore, the device 208 can control the recording medium reader 202 to search a moving-picture stream for a picture to be used for restoring an original captured still picture.

The audio output device 213 converts the decoded audio data into an analog audio signal. The audio output device 213 includes, for example, a D/A converter, an amplifier, and a connection terminal which are successively connected. The audio output device 213 feeds the analog audio signal to loudspeakers 213A. The loudspeakers 213A convert the analog audio signal into corresponding sounds.

The picture output device 214 converts the decoded moving-picture data into an analog moving-picture signal. In addition, the picture output device 214 converts the reproduced original still-picture data into an analog still-picture signal. The picture output device 214 includes, for example, a combination of a D/A converter and a connection terminal. The picture output device 214 feeds the analog moving-picture signal and the analog still-picture signal to a monitor (a display) 214A. The monitor 214A visualizes pictures represented by the analog moving-picture signal and at least one picture represented by the analog still-picture signal.

The monitor 214A may be provided with loudspeakers. In this case, the audio output device 213 is connected to the loudspeakers in the monitor 214A.

The restoration of the original still-picture data from the supplementary still-picture information and the corresponding portion of the moving-picture data will be described below in more detail.

Upon the reception of a command to playback a desired still picture from the user interface 203, the CPU 204 derives information about a moving picture linked with the desired still-picture from the TMG.ifo file in the management data memory 206. The derived information includes information in the Linked_video_program_number field and information in the Linked_video_entry_time field within the partial still-picture program structural body (see FIG. 12) having an ID number equal to that of the desired still picture. The CPU 204 sends the Linked_video_program_number information and the Linked_video_entry_time information to the random access controller 208.

In response to the Linked_video_program_number information, the random access controller 208 identifies a moving-picture program to be searched. In response to the Linked_video_entry_time information, the random access controller 208 identifies a picture in the identified moving-picture program which is linked with the desired still picture. The identified picture in the identified moving-picture program is equal or similar in capture timing to the desired still picture. The random access controller 208 generates a search control signal for finding the identified picture in the identified moving-picture program. The random access controller 208 outputs the generated search control signal to the recording medium reader 202.

In response to the search control signal, the device 202 reads out, from the recording medium 201, a portion of the moving-picture data which represents the identified picture in the identified moving-picture program. The read-out moving-picture data is transmitted from the recording medium reader 202 to the moving-picture decoder 211 through the disc deformatter 205 and the demultiplexer 207. The device 211 decodes the moving-picture data, and feeds the decoded moving-picture data to the still-picture restorer 212.

The restorer 212 receives the supplementary still-picture information from the supplementary still-picture decoder 210. The still-picture restorer 212 reproduces data representative of the original version of the desired still picture from the supplementary still-picture information and the moving-picture data fed from the moving-picture decoder 211 which is equal or similar in capture timing to the supplementary still-picture information.

According to a first example of the restoration of the original still picture, the moving-picture data fed to the still-picture restorer 212 from the moving-picture decoder 211 represents a moving-picture odd field of 720 by 240 pixels while the supplementary still-picture information represents an even field of 720 by 240 pixels which mates with the foregoing odd field (see FIG. 20). The still-picture restorer 212 combines the moving-picture data and the supplementary still-picture information to merge the odd field and the even field into a complete progressive frame of 720 by 480 pixels which is the desired still picture (the original still picture).

According to a second example of the restoration of the original still picture, the moving-picture data fed to the still-picture restorer 212 from the moving-picture decoder 211 represents a moving-picture progressive frame of 720 by 480 pixels while the supplementary still-picture information represents a supplementary still-picture progressive frame of 1440 by 960 pixels (see FIG. 21). The still-picture restorer 212 oversamples the moving-picture data to get second data representing a moving-picture progressive frame of 1440 by 960 pixels. The still-picture restorer 212 combines the second moving-picture data and the supplementary still-picture information into data representing a progressive frame of 1440 by 960 pixels which is the desired still picture (the original still picture).

Both the first and second examples of the restoration of the original still picture can be implemented by the apparatus of FIG. 24. Specifically, the CPU 204 accesses the management data memory 206 to refer to information in the supplement_info field, the Horizontal_video_resolution field, the Vertical_video_resolution field, and the TV-system field in the partial still-picture program information structural body S_PR_IFO_k (see FIG. 12). The CPU 204 detects the logic state of the supplement_info information. When the detected logic state is "01" corresponding to an odd field (a top field) or "10" corresponding to an even field (a bottom field), the CPU 204 decides that the first example of the restoration of the original still picture should be implemented. In this case, the CPU 204 controls the still-picture restorer 212 to carry out the first example of the restoration of the original still picture. When the detected logic state is "11" corresponding to oversampling, the CPU 204 decides that the second example of the restoration of the original still picture should be implemented. In this case, the CPU 204 controls the still-picture restorer 212 to carry out the second example of the restoration of the original still picture. Furthermore, the CPU 204 derives the numbers of horizontally-arranged pixels and vertically-arranged pixels composing the original still picture from the Horizontal_video_resolution information and the Vertical_video_resolution information. In addition, the CPU 204 derives the numbers of horizontally-arranged pixels and vertically-arranged pixels composing a moving-picture frame from the TV_system information. Then, the CPU 204 calculates the ratios between the numbers of horizontally-arranged pixels and vertically-arranged pixels composing the original still picture and the numbers of horizontally-arranged pixels and vertically-arranged pixels composing a moving-picture frame. The CPU 204 decides a desired magnification of oversampling on the basis of the calculated ratios. The CPU 204 controls the still-picture restorer 212 to implement oversampling at the desired magnification.

The CPU 204 can control the devices 202, 203, and 205-214. The CPU 204 operates in accordance with a control program (a computer program) stored in its internal memory. The control program may be read out from a recording medium before being stored into the memory within the CPU 204. Alternatively, the control program may be downloaded into the memory within the CPU 204 via a communication network.

Figure 25:
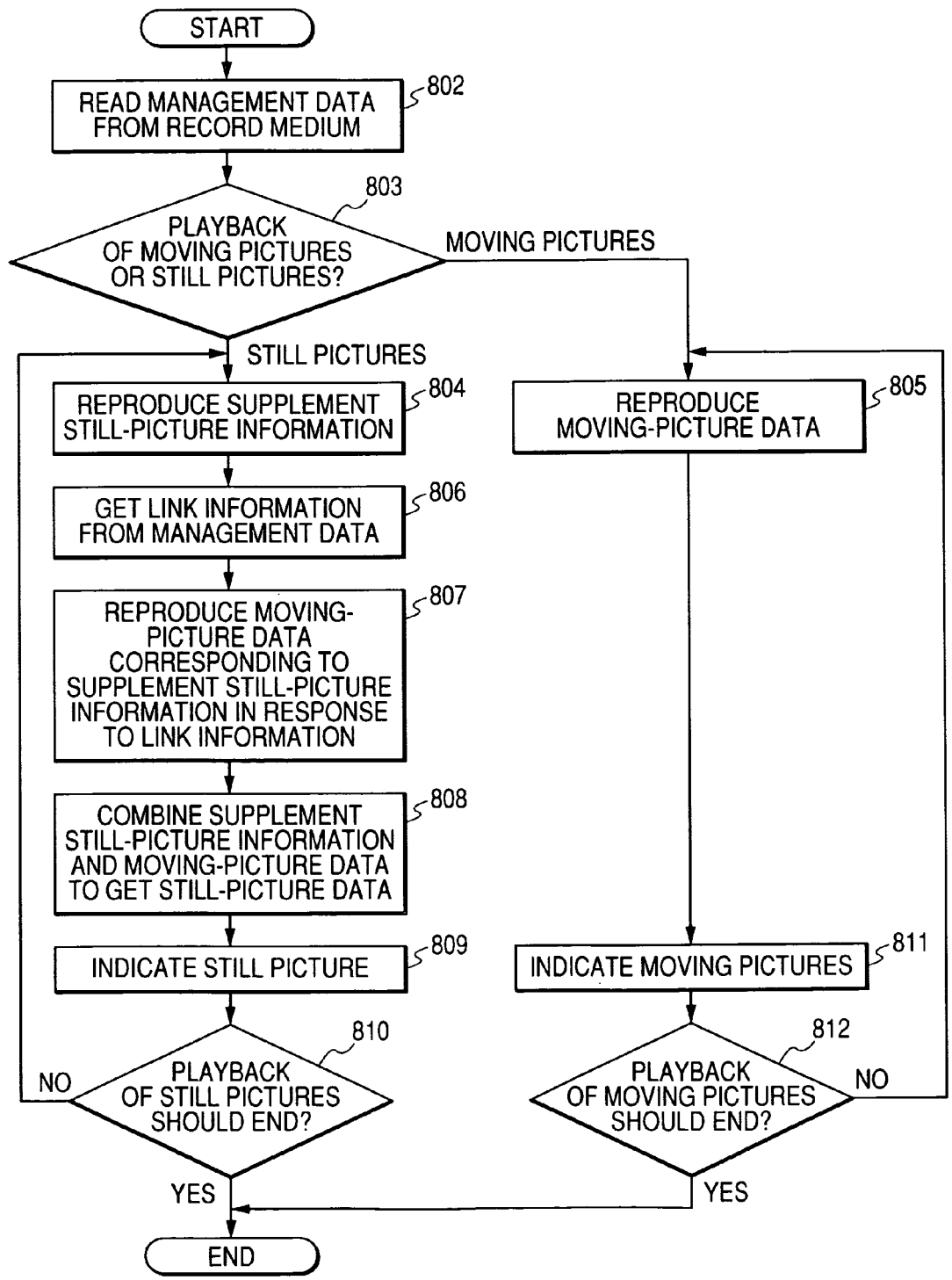
FIG. 25 is a flowchart of a control program for a CPU in FIG. 24.

FIG. 25 is a flowchart of the computer program. As shown in FIG. 25, a first step 802 of the computer program controls the recording medium reader 202 to read out the TMG.ifo file, that is, the management data, from the recording medium 201. The step 802 controls the management data memory 206 to store the read-out TMG.ifo file thereinto.

A step 803 following the step 802 decides whether the playback of moving pictures or the playback of still pictures is requested by referring to, for example, information from the user interface 203. When it is decided that the playback of still pictures is requested, the computer program advances from the step 803 to a step 804. On the other hand, when it is decided that the playback of moving pictures is requested, the computer program advances from the step 803 to a step 805.

The step 804 controls the recording medium reader 202 to read out the supplementary still-picture information from the recording medium 201 which corresponds to selected one of still pictures.

A step 806 following the step 804 reads out the link information, that is, the Linked_video_program_number information and the Linked_video_entry_time information, from the TMG.ifo file in the management data memory 206 for the selected still picture.

A step 807 subsequent to the step 806 controls the recording medium reader 202 and the random access controller 208 in response to the Linked_video_program_number information and the Linked_video_entry_time information to read out, from the recording medium 201, a portion of the recorded moving-picture data which represents a moving-picture frame (or field) corresponding to the selected still picture.

A step 808 following the step 807 controls the supplementary still-picture decoder 210, the moving-picture decoder 211, and the still-picture restorer 212 to decode the read-out moving-picture data and the read-out supplementary still-picture information and combine the decoded moving-picture data and the decoded supplementary still-picture information into data representing the original version of the selected still picture.

A step 809 subsequent to the step 808 controls the still-picture restorer 212 to send the still-picture data representative of the selected still picture to the picture output device 214. The step 809 controls the picture output device 214 to convert the still-picture data into an analog still-picture signal and feed the analog still-picture signal to the monitor 214A. Thus, the monitor 214A visualize the selected still picture represented by the analog still-picture signal. In this way, the selected still picture is reproduced and played back.

A step 810 following the step 809 decides whether or not all the still pictures have been reproduced. When it is decided that all the still pictures have been reproduced, the computer program exits from the step 810 and then the current execution cycle of the computer program ends. Otherwise, the step 810 updates or changes the selected still picture from one to another, and then the computer program returns from the step 810 to the step 804.

The step 805 controls the recording medium reader 202 to read out the multiplexed data from the recording medium 201.

A step 811 following the step 805 controls the disc deformatter 205 and the demultiplexer 207 to deformat and demultiplex the read-out multiplexed data to get the deformatted moving-picture data and the deformatted audio data. Furthermore, the step 811 controls the audio decoder 209 and the moving-picture decoder 211 to decode the deformatted audio data and the deformatted moving-picture data to get the decoded audio data and the decoded moving-picture data. In addition, the step 811 controls the picture output device 214 to convert the decoded moving-picture data into an analog moving-picture signal and feed the analog moving-picture signal to the monitor 214A. Thus, the monitor 214A visualizes pictures represented by the analog moving-picture signal. The step 811 also controls the audio output device 213 to convert the decoded audio data into an analog audio signal and feed the analog audio signal to the loudspeakers 213A. Thus, the loudspeakers 213A convert the analog audio signal into corresponding sounds.

A step 812 subsequent to the step 811 decides whether or not the playback of moving pictures should be terminated by referring to, for example, information from the user interface 203. When it is decided that the playback of moving pictures should be terminated, the computer program exits from the step 812 and then the current execution cycle of the computer program ends. Otherwise, the computer program returns from the step 812 to the step 805.

Fourth Embodiment

An information recording apparatus in a fourth embodiment of this invention is similar to the apparatus of FIG. 15 or the apparatus of FIG. 23 except for points described hereafter.

The recording medium 121 (see FIG. 15 or 23) is of such a type as to allow a random access thereto. The recording medium 121 includes, for example, a hard disc or an optical disc.

The recording medium 121 may be replaced by a data transmission line or a data transmission means utilizing electromagnetic wave or light. Information recorded on the recording medium 121 may be replaced by an electronic file of data which is in an unrecorded state.

Fifth Embodiment

An information reproducing apparatus in a fifth embodiment of this invention is similar to the apparatus of FIG. 24 except for points described hereafter.

The recording medium 201 (see FIG. 24) is of such a type as to allow a random access thereto. The recording medium 201 includes, for example, a hard disc or an optical disc.

The recording medium 201 may be replaced by a data transmission line or a data transmission means utilizing electromagnetic wave or light. Information recorded on the recording medium 201 may be replaced by an electronic file of data which is in an unrecorded state.

Sixth Embodiment

An information sending apparatus in a sixth embodiment of this invention is a modification of the apparatus of FIG. 15 or the apparatus of FIG. 23. The information sending apparatus transmits data instead of recording the data on a recording medium. The transmitted data propagates along a transmission medium such as a communication line or a communication network. The information sending apparatus may broadcast the data.

Seventh Embodiment

An information receiving apparatus in a seventh embodiment of this invention is a modification of the apparatus of FIG. 24. The information receiving apparatus receives data instead of reproducing the data from a recording medium.

ADVANTAGES OF THE INVENTION

The recording medium 121 or 201 stores data in the format of FIGS. 7, 9, 10, 11, 12, 13, and 14. The moving-picture data is recorded on the recording medium 121 or 201. The still-picture data is compressed before being recorded on the recording medium as the supplementary still-picture information which can be supplemented by a corresponding portion of the moving-picture data. Data representing an original still picture can be reproduced by reading out the supplementary still-picture information and the corresponding portion of the moving-picture data from the recording medium 121 or 201, and then combining the read-out supplementary still-picture information and the read-out portion of the moving-picture data. Since the supplementary still-picture information results from the compression of the still-picture data, the total amount of moving-picture information and still-picture information recorded on the recording medium 121 or 201 can be reduced accordingly. In addition, the recording medium 121 and 201 can be efficiently used.

What is claimed is:

1. An information recording apparatus comprising:
    first means for capturing pictures and thereby generating moving-picture data representing a sequence of moving-picture fields;
    second means for capturing at least one picture and thereby generating still-picture data representing at least one still-picture frame corresponding in picture capture timing to one of the moving-picture fields represented by the moving-picture data;
    third means for removing components, which correspond to said one of the moving-picture fields, from the still-picture data generated by the second means to generate supplementary still-picture information;
    fourth means for generating link information representing the picture capture timing correspondence between the still-picture frame and said one of the moving-picture fields; and
    fifth means for recording the moving-picture data generated by the first means, the supplementary still-picture information generated by the third means, and the link information generated by the fourth means on a recording medium.

2. An information recording apparatus comprising:
    first means for capturing pictures and thereby generating moving-picture data representing a sequence of moving-picture frames having a first predetermined pixel-number-based size;
    second means for capturing at least one picture and thereby generating still-picture data representing at least one still-picture frame corresponding in picture capture timing to one of the moving-picture frames represented by the moving-picture data, the still-picture frame having a second predetermined pixel-number-based size greater than the first predetermined pixel-number-based size;
    third means for oversampling a portion of the moving-picture data which represents said one of the moving-picture frames to generate data representing a frame having a size equal to the second predetermined pixel-number-based size;
    fourth means for subtracting the data generated by the third means from the still-picture data generated by the second means to generate supplementary still-picture information;
    fifth means for generating link information representing the picture capture timing correspondence between the still-picture frame and said one of the moving-picture frames; and
    sixth means for recording the moving-picture data generated by the first means, the supplementary still-picture information generated by the fourth means, and the link information generated by the fifth means on a recording medium.

3. An information reproducing apparatus for reproducing moving-picture data, supplementary still-picture information, and link information from a recording medium which have been recoded by the information recording apparatus of claim 1, the information reproducing apparatus comprising:
    first means for reading out the supplementary still-picture information from the recording medium;
    second means for reading out the link information from the recording medium;
    third means for identifying one of moving-picture fields represented by the moving-picture data in response to the link information read out by the second means, the identified moving-picture field corresponding in picture capture timing to a still picture related to the supplementary still-picture information read out by the first means;
    fourth means for reading out a portion of the moving-picture data from the recording medium which represents the identified moving-picture field; and
    fifth means for combining the supplementary still-picture information read out by the first means and the moving-picture data portion read out by the fourth means to generate still-picture data representing an original still picture.

4. An information reproducing apparatus for reproducing moving-picture data, supplementary still-picture information, and link information from a recording medium which have been recoded by the information recording apparatus of claim 2, the information reproducing apparatus comprising:
    first means for reading out the supplementary still-picture information from the recording medium;
    second means for reading out the link information from the recording medium;
    third means for identifying one of moving-picture frames represented by the moving-picture data in response to the link information read out by the second means, the identified moving-picture frame corresponding in picture capture timing to a still picture related to the supplementary still-picture information read out by the first means;
    fourth means for reading out a portion of the moving-picture data from the recording medium which represents the identified moving-picture frame;
    fifth means for oversampling the moving-picture data portion read out by the fifth means to generate second moving-picture data; and
    sixth means for combining the supplementary still-picture information read out by the first means and the second moving-picture data generated by the fifth means to generate still-picture data representing an original still picture.

5. A computer with peripheral devices and having a computer program that enables the computer and its peripheral devices to perform the following functions of:
   capturing pictures and thereby generating moving-picture data representing a sequence of moving-picture fields;
   capturing at least one picture and thereby generating still-picture data representing at least one still-picture frame corresponding in picture capture timing to one of the moving-picture fields represented by the moving-picture data;
   removing components, which correspond to said one of the moving-picture fields, from the still-picture data to generate supplementary still-picture information;
   generating link information representing the picture capture timing correspondence between the still-picture frame and said one of the moving-picture fields; and
   recording the moving-picture data, the supplementary still-picture information, and the link information on a recording medium.

6. A computer with peripheral devices and having a computer program that enables the computer and its peripheral devices to perform the following functions of:
   capturing pictures and thereby generating moving-picture data representing a sequence of moving-picture frames having a first predetermined pixel-number-based size;
   capturing at least one picture and thereby generating still-picture data representing at least one still-picture frame corresponding in picture capture timing to one of the moving-picture frames represented by the moving-picture data, the still-picture frame having a second predetermined pixel-number-based size greater than the first predetermined pixel-number-based size;
   oversampling a portion of the moving-picture data which represents said one of the moving-picture frames to generate oversampled data representing a frame having a size equal to the second predetermined pixel-number-based size;
   subtracting the oversampled data from the still-picture data to generate supplementary still-picture information;
   generating link information representing the picture capture timing correspondence between the still-picture frame and said one of the moving-picture frames; and
   recording the moving-picture data, the supplementary still-picture information, and the link information on a recording medium.

7. A computer with peripheral devices and having a computer program that enables the computer and its peripheral devices to perform the following functions of:
   reading out supplementary still-picture information from a recording medium;
   reading out link information from the recording medium;
   identifying one of moving-picture fields represented by moving-picture data in response to the read-out link information, the identified moving-picture field corresponding in picture capture timing to a still picture related to the read-out supplementary still-picture information;
   reading out a portion of the moving-picture data from the recording medium which represents the identified moving-picture field; and
   combining the read-out supplementary still-picture information and the read-out moving-picture data portion to generate still-picture data representing an original still picture.

8. A computer with peripheral devices and having a computer program that enables the computer and its peripheral devices to perform the following functions of:
   reading out supplementary still-picture information from a recording medium;
   reading out link information from the recording medium;
   identifying one of moving-picture frames represented by moving-picture data in response to the read-out link information, the identified moving-picture frame corresponding in picture capture timing to a still picture related to the read-out supplementary still-picture information;
   reading out a portion of the moving-picture data from the recording medium which represents the identified moving-picture frame;
   oversampling the read-out moving-picture data portion to generate second moving-picture data; and
   combining the read-out supplementary still-picture information and the second moving-picture data to generate still-picture data representing an original still picture.

9. A method comprising the steps of:
   capturing pictures and thereby generating moving-picture data representing a sequence of moving-picture fields;
   capturing at least one picture and thereby generating still-picture data representing at least one still-picture frame corresponding in picture capture timing to one of the moving-picture fields represented by the moving-picture data;
   removing components, which correspond to said one of the moving-picture fields, from the still-picture data to generate supplementary still-picture information;
   generating link information representing the picture capture timing correspondence between the still-picture frame and said one of the moving-picture fields; and
   recording the moving-picture data, the supplementary still-picture information, and the link information on a recording medium.

10. A method comprising the steps of:
    capturing pictures and thereby generating moving-picture data representing a sequence of moving-picture frames having a first predetermined pixel-number-based size;
    capturing at least one picture and thereby generating still-picture data representing at least one still-picture frame corresponding in picture capture timing to one of the moving-picture frames represented by the moving-picture data, the still-picture frame having a second predetermined pixel-number-based size greater than the first predetermined pixel—number-based size;
    oversampling a portion of the moving-picture data which represents said one of the moving-picture frames to generate oversampled data representing a frame having a size equal to the second predetermined pixel-number-based size;
    subtracting the oversampled data from the still-picture data to generate supplementary still-picture information;
    generating link information representing the picture capture timing correspondence between the still-picture frame and said one of the moving-picture frames; and
    recording the moving-picture data, the supplementary still-picture information, and the link information on a recording medium.

11. A method comprising the steps of:
    reading out supplementary still-picture information from a recording medium;
    reading out link information from the recording medium;
    identifying one of moving-picture fields represented by moving-picture data in response to the read-out link information, the identified moving-picture field corresponding in picture capture timing to a still picture related to the read-out supplementary still-picture information;

reading out a portion of the moving-picture data from the recording medium which represents the identified moving-picture field; and combining the read-out supplementary still-picture information and the read-out moving-picture data portion to generate still-picture data representing an original still picture.

12. A method comprising the steps of:

reading out supplementary still-picture information from a recording medium;

reading out link information from the recording medium;

identifying one of moving-picture frames represented by moving-picture data in response to the read-out link information, the identified moving-picture frame corresponding in picture capture timing to a still picture related to the read-out supplementary still-picture information;

reading out a portion of the moving-picture data from the recording medium which represents the identified moving-picture frame;

oversampling the read-out moving-picture data portion to generate second moving-picture data; and combining the read-out supplementary still-picture information and the second moving-picture data to generate still-picture data representing an original still picture.

* * * * *